United States Patent
Kindo et al.

(10) Patent No.: US 9,898,007 B2
(45) Date of Patent: *Feb. 20, 2018

(54) AUTOMATIC DRIVING VEHICLE SYSTEM

(71) Applicant: TOYOTA JIDOSHA KABUSHIKI KAISHA, Toyota-shi, Aichi-ken (JP)

(72) Inventors: Toshiki Kindo, Yokohama (JP); Yoshinori Watanabe, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,845

(22) Filed: Apr. 26, 2016

(65) Prior Publication Data

US 2016/0313738 A1    Oct. 27, 2016

(30) Foreign Application Priority Data

Apr. 27, 2015  (JP) .................. 2015-090260

(51) Int. Cl.
  *G05D 1/02* (2006.01)
  *B62D 15/02* (2006.01)

(52) U.S. Cl.
  CPC ......... *G05D 1/0212* (2013.01); *B62D 15/025* (2013.01); *B62D 15/0255* (2013.01);
  (Continued)

(58) Field of Classification Search
  CPC .. G05D 1/0212; G05D 1/0251; G05D 1/0257; G05D 1/0274; G05D 2201/02; B62D 15/0255; B62D 15/025
  See application file for complete search history.

(56) References Cited

U.S. PATENT DOCUMENTS 8,170,739 B2   5/2012 Lee
9,227,635 B1 * 1/2016 Takamatsu .......... B62D 5/0466
(Continued)

FOREIGN PATENT DOCUMENTS

EP   2 495 156 A1   9/2012
JP   07192194 A     7/1995
(Continued)

OTHER PUBLICATIONS

Non-Final Office Action issued in U.S. Appl. No. 15/134,772, dated Apr. 25, 2017.
(Continued)

*Primary Examiner* — Rodney A Butler
(74) *Attorney, Agent, or Firm* — Sughrue Mion, PLLC

(57) ABSTRACT

An automatic driving vehicle system includes: a surrounding information recognition unit that recognizes surrounding information of a vehicle; a vehicle state recognition unit that recognizes a vehicle state of the vehicle; a running plan generation unit that generates a running plan based on the surrounding information of the vehicle and that generates a control band of a target control value for the vehicle in the running plan, based on at least one of the vehicle state and the surrounding information; a first computation unit that computes a command control value such that the vehicle state becomes a target vehicle state corresponding to the target control value, based on the running plan, the vehicle state and the control band; and an actuator that controls the running of the vehicle based on the command control value. The system may also include an actuator control unit.

15 Claims, 12 Drawing Sheets

(52) U.S. Cl.
CPC ......... *G05D 1/0251* (2013.01); *G05D 1/0257*
(2013.01); *G05D 1/0274* (2013.01); *G05D*
*2201/02* (2013.01)

(56) References Cited

U.S. PATENT DOCUMENTS

| | | |
|---|---|---|
| 2009/0222170 A1 | 9/2009 | Scherl et al. |
| 2010/0004821 A1 | 1/2010 | Buerkle et al. |
| 2010/0228420 A1 | 9/2010 | Lee |
| 2012/0323473 A1* | 12/2012 | Irie ...................... B60W 10/06 701/117 |
| 2013/0197758 A1 | 8/2013 | Ueda et al. |
| 2015/0025731 A1 | 1/2015 | Uehara |
| 2016/0311431 A1* | 10/2016 | Kato ................... B60W 30/165 |
| 2016/0313738 A1 | 10/2016 | Kindo et al. |

FOREIGN PATENT DOCUMENTS

| | | |
|---|---|---|
| JP | 2008180591 A | 8/2008 |
| JP | 2009129230 A | 6/2009 |
| JP | 2016203882 A | 12/2016 |
| WO | 2012/068331 A1 | 5/2012 |
| WO | 2014/148025 A1 | 9/2014 |

OTHER PUBLICATIONS

Notice of Allowance dated Oct. 10, 2017 from U.S. Patent & Trademark Office in U.S. Appl. No. 15/134,772.

* cited by examiner

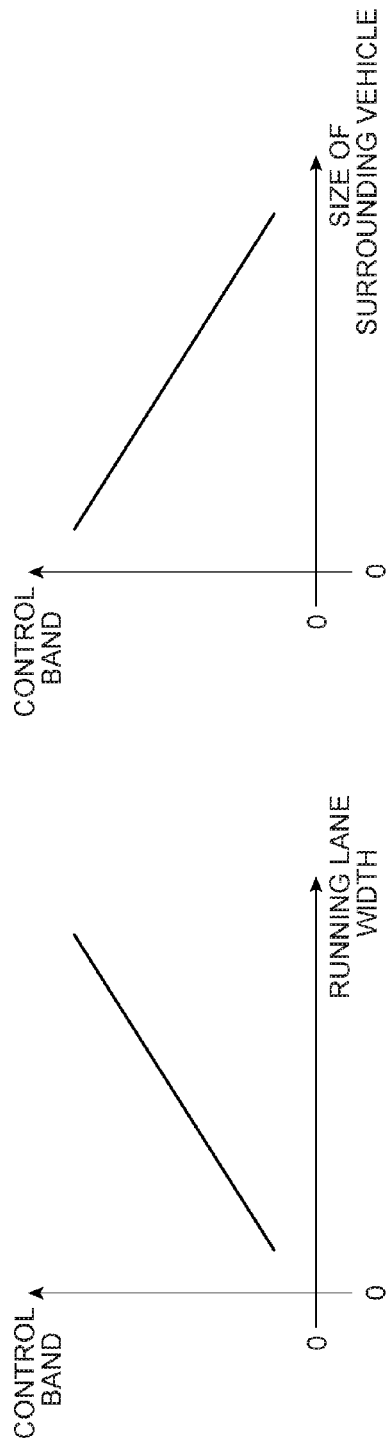
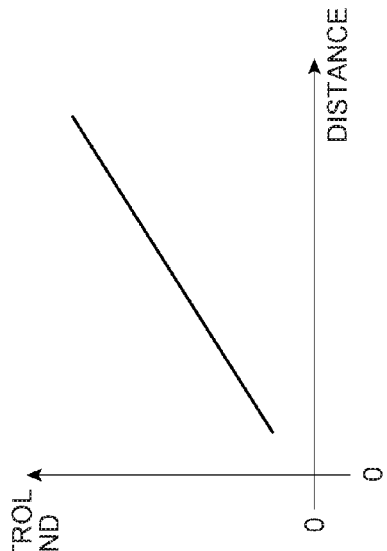
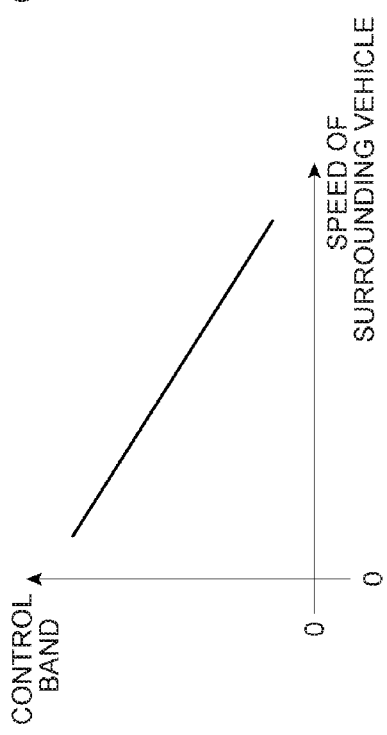
FIG. 5A
FIG. 5B
FIG. 5C
FIG. 5D

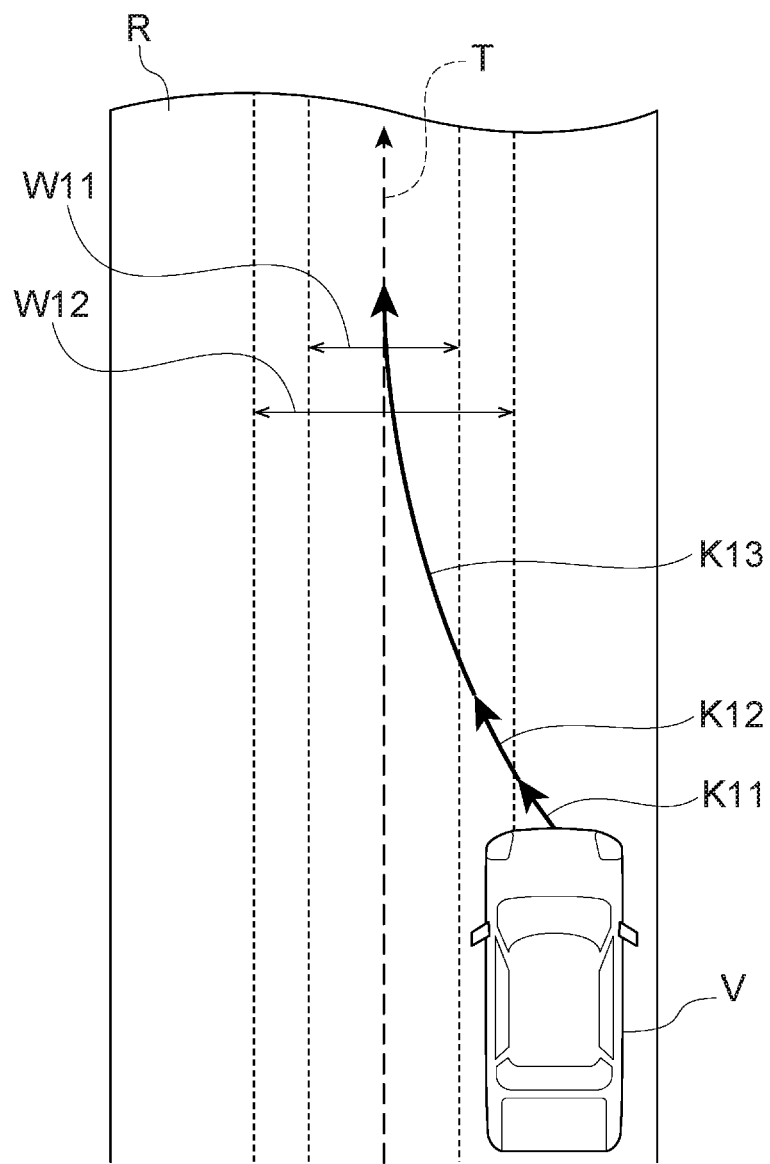

… (1)

AUTOMATIC DRIVING VEHICLE SYSTEM

CROSS-REFERENCE TO RELATED APPLICATIONS

The disclosure of Japanese Patent Application No. 2015-090260 filed on Apr. 27, 2015 including the specification, drawings and abstract is incorporated herein by reference in its entirety.

BACKGROUND

1. Technical Field

This disclosure relates to an automatic driving vehicle system.

2. Description of Related Art

As described in US 2010/0228420 A, for example, there is an automatic driving vehicle system that controls the running of a vehicle. Such an automatic driving vehicle system, for example, calculates a track on which the vehicle should run, and controls the steering such that the vehicle runs on the calculated track.

The situation of the vehicle differs between a case where the vehicle slightly departs from the track on which the vehicle should run, and a case where the vehicle greatly departs from the track on which the vehicle should run. However, the related automatic driving vehicle system controls the running of the vehicle toward the track on which the vehicle should run, in the same manner, in both cases where the vehicle slightly departs from the track on which the vehicle should run and the case where the vehicle greatly departs from the track on which the vehicle should run. Thus, even though it is unnecessary to make the vehicle rapidly run toward the track on which the vehicle should run because of a slight departure from the track on which the vehicle should run, the related automatic driving vehicle system controls the running of the vehicle in the same manner as the case where the vehicle greatly departs from the track on which the vehicle should run. Therefore, in the related automatic driving vehicle system, the ride quality of the vehicle sometimes becomes worse, in the case where the vehicle slightly departs from the track on which the vehicle runs.

SUMMARY

Exemplary embodiments of the present disclosure provide an automatic driving vehicle system with a surrounding information recognition unit configured to recognize a vehicle state of the vehicle, a vehicle state recognition unit that recognizes a vehicle state of the vehicle, a running plan generation unit that generates a running plan based on the surrounding information of the vehicle and that generates a control band of a target control value for the vehicle in the running plan, based on at least one of the vehicle state and the surrounding information, a computation unit that computes a command control value such that the vehicle state becomes a target vehicle state corresponding to the target control value, based on the running plan, the vehicle state and the control band, and an actuator that controls the running of the vehicle based on the command control value. The system may also include an actuator control unit that is configured to control a parameter for the actuator based on the vehicle state and the control band.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5A is a diagram for describing the setting of the control band based on the width of a running lane;

FIG. 5B is a diagram for describing the setting of the control band based on the size of a surrounding vehicle;

FIG. 5C is a diagram for describing the setting of the control band based on the band of the speed of the surrounding vehicle;

FIG. 5D is a diagram for describing the setting of the control band based on the distance between the surrounding vehicle and a target track for a vehicle;

FIG. 12 is a plan view for describing a change in vehicle position in the case where multiple control bands are generated.

DETAILED DESCRIPTION OF EMBODIMENTS

Figure 1:
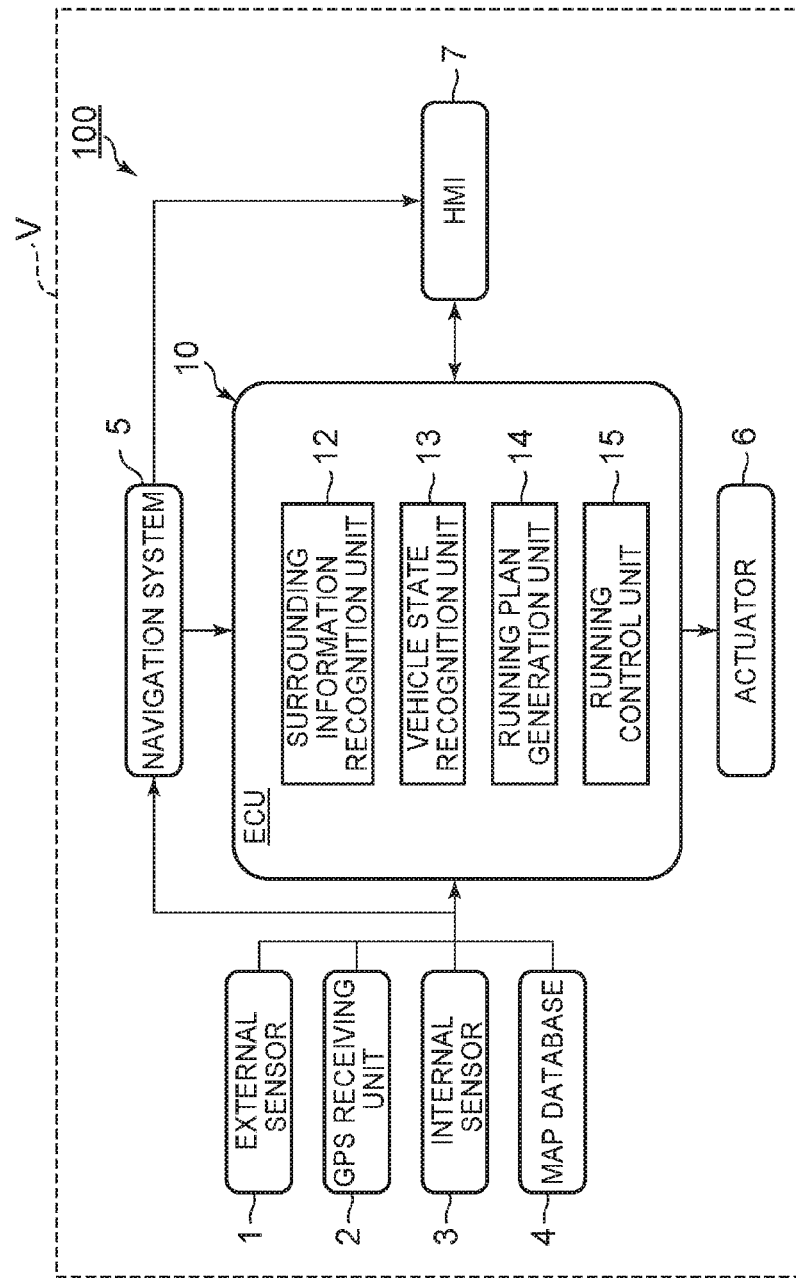
FIG. 1 is a block diagram showing a configuration of an automatic driving vehicle system according to a first embodiment.

Hereinafter, exemplary embodiments of the disclosure will be described in detail, with use of the drawings. Here, in the following description, to identical or corresponding elements, identical reference characters are assigned, and repetitive descriptions are omitted.

First Embodiment

FIG. 1 is a block diagram showing a configuration of an automatic driving vehicle system 100 according to a first embodiment. As shown in FIG. 1, the automatic driving vehicle system 100 is mounted in a vehicle V such as an automobile. The automatic driving vehicle system 100 includes an external sensor 1, a GPS [Global Positioning System] receiving unit 2, an internal sensor 3, a map database 4, a navigation system 5, an actuator 6, an ECU [Electronic Control Unit] 10, and an HMI [Human Machine Interface] 7.

The external sensor 1 is detection equipment to detect the surrounding information of the vehicle V. The external sensor 1 includes at least one of a camera, a radar and a LIDAR [Laser Imaging Detection and Ranging].

The camera is an imaging device to image the surround of the vehicle V. The camera, for example, is provided on the vehicle interior side of the vehicle V relative to a windshield. Alternatively, the camera may be provided on the exterior of the vehicle. The camera sends the taken imaging information to the ECU 10. The camera may be a monocular camera, or may be a stereo camera. The stereo camera includes two imaging units arranged such that binocular parallax is reproduced. The imaging information of the stereo camera includes also the information about a depth direction.

The radar detects an obstacle outside the vehicle V, using a radio wave (for example, a millimeter wave). The radar detects the obstacle by sending the radio wave around the vehicle V and receiving the radio wave reflected by the obstacle. The radar sends the detected obstacle information to the ECU 10.

The LIDAR detects an obstacle outside the vehicle V, using light. The LIDAR detects the obstacle by sending light around the vehicle V and receiving the light reflected by the obstacle to measure the distance to the reflection point. The LIDAR sends the detected obstacle information to the ECU 10. The automatic driving vehicle system 100 only needs to include one of the camera, the LIDAR or the radar, but may include more than one type of detection and measurement device.

The GPS receiving unit 2 receives signals from three or more GPS satellites, and thereby, measures the position of the vehicle V (for example, the latitude and longitude of the vehicle V). The GPS receiving unit 2 sends the measured position information of the vehicle V, to the ECU 10. Here, other means that can identify the latitude and longitude of the vehicle V may be used, instead of the GPS receiving unit 2. Further, it is preferable to have a function of measuring the orientation of the vehicle V, for the matching between the measurement results of sensors and the map information described later.

The internal sensor 3 is detection equipment to detect the running state of the vehicle V. The internal sensor 3 includes a speed sensor, an acceleration sensor and a yaw rate sensor. Here, the internal sensor 3 does not always need to include the acceleration sensor and the yaw rate sensor. The speed sensor is a detector to detect the speed of the vehicle V. The speed sensor may be, for example, a wheel speed sensor that is provided at a wheel of the vehicle V, a drive shaft to rotate integrally with the wheel or the like and that detects the rotational speed of the wheel is used. The speed sensor sends the detected vehicle speed information (wheel speed information), to the ECU 10.

The acceleration sensor is a detector to detect the acceleration (acceleration/deceleration rate) of the vehicle V. The acceleration sensor, for example, includes a front-back acceleration sensor to detect the acceleration in the front-back direction of the vehicle V, and a lateral acceleration sensor to detect the lateral acceleration of the vehicle V. The acceleration sensor sends the acceleration information of the vehicle V, to the ECU 10. The yaw rate sensor is a detector to detect the yaw rate (rotational angular velocity) around the vertical axis of the gravity center of the vehicle V. As the yaw rate sensor, for example, a gyro sensor can be used. The yaw rate sensor sends the detected yaw rate information of the vehicle V, to the ECU 10.

The map database 4 is a database containing map information. The map database, for example, is formed in an HDD [Hard Disk Drive] or SSD (solid state drive) that is mounted inside the vehicle. The map information, for example, includes the position information of roads, the information of road shapes (for example, types of curves and straight parts, curvatures of curves or the like), and the position information of intersections and crossroads. Furthermore, the map information may include the position information of shield structures such as buildings and walls, and include the output signal of the external sensor 1 for using the SLAM (Simultaneous Localization and Mapping) technology. Alternatively, the map information may be stored in a computer that is in a facility such as an information processing center and that can communicate with the vehicle V.

The navigation system 5 is an apparatus to guide a driver of the vehicle V, to a destination set by the driver of the vehicle V. The navigation system 5 calculates a route along which the vehicle V runs, based on the position information of the vehicle V measured by the GPS receiving unit 2 and the map information of the map database 4. As the route, an appropriate lane may be specified in a section of multiple lanes. The navigation system 5, for example, computes a target route from the position of the vehicle V to the destination, and informs the driver of the target route by the indication on a display or the voice output from a speaker. The navigation system 5, for example, sends the information of the target route for the vehicle V, to the ECU 10. Here, the navigation system 5 may be provided in a computer that is in a facility such as an information processing center and that can communicate with the vehicle V. Alternatively, the navigation system 5 can be mounted inside the vehicle.

The actuator 6 is equipment to execute the control of the running of the vehicle V. The actuator 6 includes, at least, a throttle actuator, a brake actuator and a steering actuator. The throttle actuator controls the supply rate of air for an engine (the throttle opening angle (the output of the actuator)) in response to a command control value (command signal) from the ECU 10, and controls the driving force of the vehicle V. Here, in the case where the vehicle V is a hybrid vehicle or an electric vehicle, the throttle actuator is not included, and the command control value from the ECU 10 is input to a motor that is a dynamic power source, so that the driving force (the output of the actuator) is controlled.

The brake actuator controls a brake system in response to a command control value from the ECU 10, and controls the braking force (the output of the actuator) that is given to wheels of the vehicle V. As the brake system, for example, a hydraulic brake system can be used. The steering actuator controls the drive of an assist motor that is of an electric power steering system and that controls the steering torque (the output of the actuator), in response to a command control value from the ECU 10. Thereby, the steering actuator controls the steering torque of the vehicle V.

The HMI 7 is an interface for performing the output and input of information between an occupant (including the driver) in the vehicle V and the automatic driving vehicle system 100. The HMI 7, for example, may include a display panel for displaying image information to the occupant, a speaker for voice output, an operation button or a touch panel by which the occupant performs input operation, or the like. When the occupant performs an input operation relevant to the actuation or stop of automatic running, the HMI 7 starts or stops the automatic running by outputting a signal to the ECU 10. When the vehicle arrives at a destination where the automatic driving is finished, the HMI 7 notifies the occupant of the destination arrival. The HMI 7 may output information to the occupant by using a portable information terminal that is wirelessly connected, such as a cellular telephone, and may receive the input operation from the occupant by using the portable information terminal.

As shown in FIG. 1, the ECU 10 controls the automatic running of the vehicle V. The ECU 10 is an electronic control unit including a CPU [Central Processing Unit], a ROM [Read Only Memory], a RAM [Random Access Memory] and the like. In the ECU 10, a program stored in the ROM is loaded into the RAM and is executed by the CPU, and thereby, various controls are executed. The ECU 10 may be configured by multiple electronic control units.

The ECU 10 includes a surrounding information recognition unit (surrounding information recognizer) 12, a vehicle state recognition unit (vehicle state recognizer) 13, a running plan generation unit (running plan generator) 14 and a running control unit (computer) 15.

The surrounding information recognition unit 12 recognizes the surrounding information of the vehicle V, based on the detection result of the external sensor 1 (for example, the imaging information of the camera, the obstacle information of the radar, the obstacle information of the LIDAR, and the like) and the like. The surrounding information, for example, includes the white line position or lane center position in the running lane relative to the vehicle V, the width of the running lane, the shape of the road (for example, the curvature of the running lane, the grade change on the road surface that is useful in the visibility estimation of the external sensor 1, the winding, and the like), and the situation of an obstacle (for example, a surrounding vehicle or the like) in the surrounding of the vehicle V (for example, the information for discriminating between a fixed obstacle and a moving obstacle, the position of the obstacle relative to the vehicle V, the speed of the obstacle, the moving direction of the obstacle relative to the vehicle V, the relative speed of the obstacle to the vehicle V, the size of the obstacle, and the like). Further, the system may enhance the accuracy of the position and direction of the vehicle V acquired by the GPS receiving unit 2 or the like, by the matching between the detection result of the external sensor 1 and the map information.

The surrounding information further includes road type information. The road type information, for example, includes the information about whether the road on which the vehicle V runs is a freeway or a general road. For example, the information about whether the road is a freeway or a general road may be included in the map information contained in the map database 4. In this case, the surrounding information recognition unit 12 may recognize whether the running lane is on a freeway or on a general road, based on the map information contained in the map database 4 and the vehicle position of the vehicle V recognized by the vehicle state recognition unit 13.

The surrounding information further includes the distance between a surrounding vehicle that runs in the surrounding of the vehicle V and a target track for the vehicle V. The surrounding information recognition unit 12 may recognize the distance between the surrounding vehicle and the target track for the vehicle V, for example, based on the surrounding information detected by the external sensor 1 and the target track for the vehicle V generated by the running plan generation unit 14. Specifically, for example, in the case where the external sensor 1 includes the radar, the surrounding information recognition unit 12 recognizes the position of the surrounding vehicle, based on the detection result of the radar. The surrounding information recognition unit 12 may recognize the distance between the surrounding vehicle and the target track for the vehicle V, based on the target track for the vehicle V generated by the running plan generation unit 14 and the recognized position of the surrounding vehicle.

The surrounding information further includes the color and line type of a boundary line of the running lane that is present on the right side of the vehicle V. For example, the color and line type of the boundary line on the right side of the running lane may be included in the map information contained in the map database 4. In this case, the surrounding information recognition unit 12 may recognize the color and line type of the boundary line on the right side of the running lane, based on the map information contained in the map database 4 and the vehicle position of the vehicle V recognized by the vehicle state recognition unit 13. Alternatively, for example, in the case where the external sensor 1 includes the camera, the surrounding information recognition unit 12 may recognize the color and line type of the boundary line on the right side of the running vehicle, based on the imaging information of the camera.

The surrounding information further includes the size of a flat area lateral to the running lane for the vehicle V. The flat area lateral to the running road is a flat area that is continuously connected with the running lane across the boundary line of the running lane. For example, in the case where the external sensor 1 includes the stereo camera, the surrounding information recognition unit 12 may recognize the size of the flat area, by performing image processing based on the imaging information of the stereo camera.

The surrounding information further includes the state of the road surface of the running road for the vehicle V. The state of the road surface includes the information about whether the road surface is dry or wet. For example, in the case where the external sensor 1 includes the camera, the surrounding information recognition unit 12 may recognize whether the road surface is dry or wet, by performing image processing based on the imaging information of the camera.

The vehicle state recognition unit 13 recognizes the vehicle state of the vehicle V. The vehicle state may include the position of the vehicle V (hereinafter, referred to as the "vehicle position"), the running state of the vehicle V, and the characteristic information of the vehicle V.

The vehicle state recognition unit 13 recognizes the vehicle position on the map, based on the position information of the vehicle V received by the GPS receiving unit 2 and the map information of the map database 4. Here, the vehicle state recognition unit 13 may perform the recognition by acquiring, from the navigation system 5, the vehicle position that is used in the navigation system 5. In the case where the vehicle position of the vehicle V can be measured by a sensor placed in the exterior, for example, on the road, the vehicle state recognition unit 13 may acquire the vehicle position from the sensor by communication.

The vehicle state recognition unit 13 recognizes the running state of the vehicle V, based on the detection result of the internal sensor 3 (for example, the vehicle speed information of the speed sensor, the acceleration information of the acceleration sensor, the yaw rate information of the yaw rate sensor, and the like). The running state of the vehicle V, for example, includes the speed, acceleration and yaw rate of the vehicle V.

The vehicle state recognition unit 13, for example, may recognize the size of the vehicle V and the reliability of a sensor, as the characteristic information. The size of the vehicle V may be the size in the front-back direction of the vehicle V, or may be the size in the vehicle width direction of the vehicle V. Alternatively, the size of the vehicle V may include both of the size in the front-back direction of the vehicle V and the size in the vehicle width direction of the vehicle V. The size of the vehicle V may be previously stored in a storage unit connected with the ECU 10, or the like. The vehicle state recognition unit 13 may recognize the size of the vehicle V, by reading the size of the vehicle V stored in the storage unit or the like.

The reliability of the sensor, for example, may be the reliability of the detection result of each sensor included in the external sensor 1 and the internal sensor 3. The reliability, for each sensor, may be previously stored in the storage unit connected with the ECU 10, or the like. The vehicle state recognition unit 13 may recognize the reliability of the detection result of the sensor, by reading the reliability stored in the storage unit connected with the ECU 10, or the like. Alternatively, in the case where two sensors capable of detecting the same object are included in the external sensor 1 and the internal sensor 3, the vehicle state recognition unit 13 may compare the detection results of the two sensors, and may recognize the reliabilities of the detection results of the sensors, based on the comparison result. For example, the vehicle state recognition unit 13 may recognize that the reliabilities of the detection results of the sensors are high in the case where the detection results of the two sensors are identical, and may recognize that the reliabilities of the detection results of the sensors are low in the case where the detection results of the two sensors are different. Specifically, for example, in the case where the recognition result for an obstacle based on the imaging information of the camera coincides with the recognition result for the obstacle based on the obstacle information of the radar, the vehicle state recognition unit 13 may recognize that the reliability of the detection result of the camera and the reliability of the detection result of the radar are high. On the other hand, in the case where the recognition result for the obstacle based on the imaging information of the camera does not coincide with the recognition result for the obstacle based on the obstacle information of the radar, the vehicle state recognition unit 13 may recognize that the reliability of the detection result of the camera and the reliability of the detection result of the radar are low.

The running plan generation unit 14 generates the target track for the vehicle V, for example, based on the target route computed by the navigation system 5 and the surrounding information (including the position and orientation of the surrounding vehicle) of the vehicle V recognized by the surrounding information recognition unit 12. The target track is a track of the vehicle V that advances on the target route. The running plan generation unit 14 generates the target track such that the vehicle V suitably runs on the target route in light of criteria of safety, compliance, running efficiency and the like. Needless to say, on this occasion, the running plan generation unit 14 generates the target track for the vehicle V, so as to avoid the contact with the obstacle, based on the situation of the obstacle in the surrounding of the vehicle V.

The target route here includes also a running route that is automatically generated based on the surrounding information and the map information when the setting of the destination is not explicitly by the driver, as exemplified by an along-road running route in a "driving assistance device" described in Japanese Patent No. 5382218 (WO 2011/158347) or an "automatic driving device" described in Japanese Patent Application Publication No. 2011-162132.

The running plan generation unit 14 generates a running plan corresponding to the generated target track. That is, the running plan generation unit 14 generates a running plan in accordance with the previously set target route, based on the surrounding information of the vehicle V and the map information of the map database 4. Here, the running plan generation unit 14 may generate the running plan without using the map information of the map database 4. For example, the running plan generation unit 14 decides the target track based on the surrounding information of the vehicle V, and generates a running plan corresponding to the decided target track. The running plan includes a target control value that is a target for controlling the vehicle state of the vehicle V. Preferably, the running plan generation unit 14 should generate, as the target control value in the running plan, multiple combinations each of which has two elements of a target position p in a coordinate system fixed at the vehicle V and a target speed v at the target position, that is, multiple configuration coordinates (p,v). Here, each target position p has at least the x-coordinate and y-coordinate positions in the coordinate system fixed at the vehicle V, or the information equivalent to them. The target control value in the running plan is not limited to be shown by the above-described configuration coordinates. In the running plan, as the target control value, for example, a target time t may be used instead of the target speed v of the above-described configuration coordinates (p,v). Further, in the case where the target time t is used instead of the target speed v of the above-described configuration coordinates (p,v), the target control value may further include the orientation of the vehicle V at the target time t.

In addition to the multiple target positions through which the vehicle V should pass along the target track and the target speeds at the respective target positions, the running plan may include, as the target control value, at least one of the curvatures of the target track for the vehicle V at the respective target positions, the target yaw angles of the vehicle V at the respective target positions, and the target accelerations of the vehicle V at the respective target positions.

Further, typically, the future data for several seconds from the current time is roughly sufficient for the running plan. However, depending on situations such as a right turn at an intersection and an overtaking of the vehicle V, the data for several tens of seconds is necessary. Therefore, preferably, the number of configuration coordinates in the running plan should be variable, and the distance between configuration coordinates should be variable. Furthermore, a curve connecting the configuration coordinates may be approximated by a spline function or the like, and parameters of the curve may be adopted as the running plan. For the generation of the running plan, an arbitrary known method can be used, if it allows for the expression of a behavior of the vehicle V.

The running plan may be the data showing transitions of the target speed, target acceleration/deceleration rate, target steering torque and others of the vehicle V when the vehicle V runs on the target track along the target route. The running plan may include a target speed pattern, target acceleration/deceleration rate pattern and target steering pattern of the vehicle V. The running plan generation unit 14 here may generate the running plan such that the travel time (the time required until the vehicle V arrives at the destination) is minimized.

Incidentally, the target speed pattern, for example, is the data of the target vehicle speed that is set in association with time for each target control position, with respect to target control positions set on the target track at a predetermined interval (for example, 1 m). The target acceleration/deceleration rate pattern, for example, is the data of the target acceleration/deceleration rate that is set in association with time for each target control position, with respect to target control positions set on the target track at a predetermined interval (for example, 1 m). The target steering pattern, for example, is the data of the target steering torque that is set in association with time for each target control position, with respect to target control positions set on the target track at a predetermined interval (for example, 1 m).

In addition to the running plan, for example, the running plan generation unit 14 further generates a control band of the target control value for the vehicle V in the running plan. The running plan generation unit 14 generates the control band, based on the surrounding information of the vehicle V recognized by the surrounding information recognition unit 12 and the vehicle state recognized by the vehicle state recognition unit 13. The control band is set for each target control value in the running plan. However, the running plan generation unit 14 does not need to generate control bands corresponding to all kinds of target control values in the running plan. For example, in the case where the target position and the target speed are set as the target control value, the running plan generation unit 14 may generate the control band only for the target position.

Further, the control band has the same dimension (unit) as the target control value for the vehicle in the running plan. That is, for example, in the case where the target position is included as the target control value, the control band of the target position is a band of position. For example, in the case where the target speed is included as the target control value, the control band of the target speed is a band of speed. For example, in the case where the curvature of the target track is included as the target control value, the control band of the curvature of the target track is a band of curvature. For example, in the case where the target yaw angle of the vehicle V is included as the target control value, the control band of the target yaw angle is a band of angle. For example, in the case where the target acceleration is included as the target control value, the control band of the target acceleration is a band of acceleration. For example, in the case where the target time is included as the target control value, the control band of the target time is a band of time.

The control band to be generated by the running plan generation unit 14 is a band of target control values that are permissible in the running plan even when the vehicle state departs from the target vehicle state. For example, the running plan generation unit 14 may generate the control band in consideration of the ride quality, safety degree, or other aspects of the vehicle. The generation of the control band in consideration of the ride quality of the vehicle, for example, may be the generation of a band of target control values that allow the vehicle V to run such that the lateral acceleration to be generated for the vehicle V becomes a previously decided reference value or less. The generation of the control band in consideration of the safety degree of the vehicle may be the generation of a band of target control values that allow the vehicle V to run such that the inter-vehicle distance to a vehicle in the surrounding of the vehicle V becomes a previously decided reference value or greater.

Figure 2:
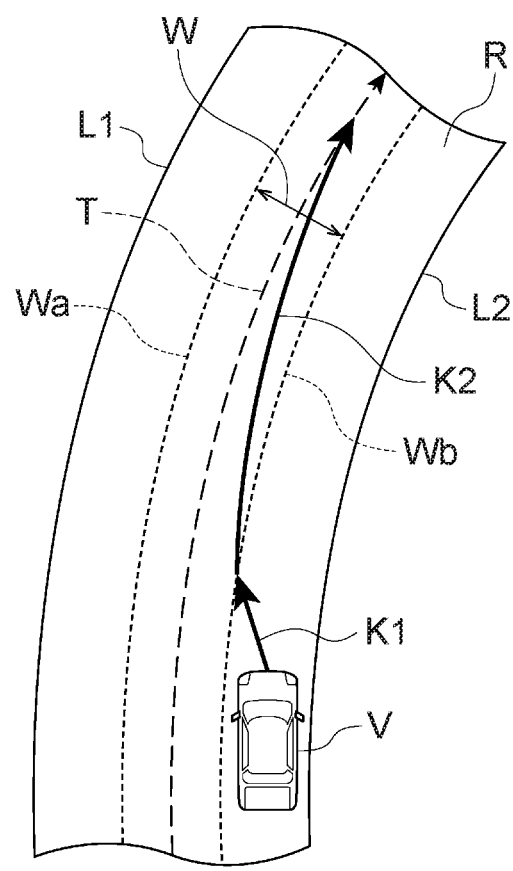
FIG. 2 is a plan view for describing the setting of a running plan and a control band.

Here, a specific example of the running plan and the control band will be described. FIG. 2 is a plan view for describing the setting of the target position and the control band of the target position in the case where the target position is included as the target control value in the running plan. Reference character R shown in FIG. 2 denotes a running lane on which the vehicle V runs. Reference characters L1, L2 shown by the solid lines denote white lines that are boundaries between the running lane R and adjacent lanes or the like. Reference character T shown by the broken line denotes a target track that connects multiple target positions in the running plan. Reference character W denotes the control band of the target position. The control band W can be shown as the length between a control band boundary line Wa and a control band boundary line Wb in the normal direction to the target track T that connects the target positions. The control band boundary line Wa is a curve that connects the maximum values on the left side of the vehicle V in the control bands generated for the respective target positions. The control band boundary line Wb is a curve that connects the maximum values on the right side of the vehicle V in the control bands generated for the respective target positions. As an example, FIG. 2 shows a case where the control band is set by the width of the running lane described later, and as a result, shows a case where the control band W is constant.

Figure 3:
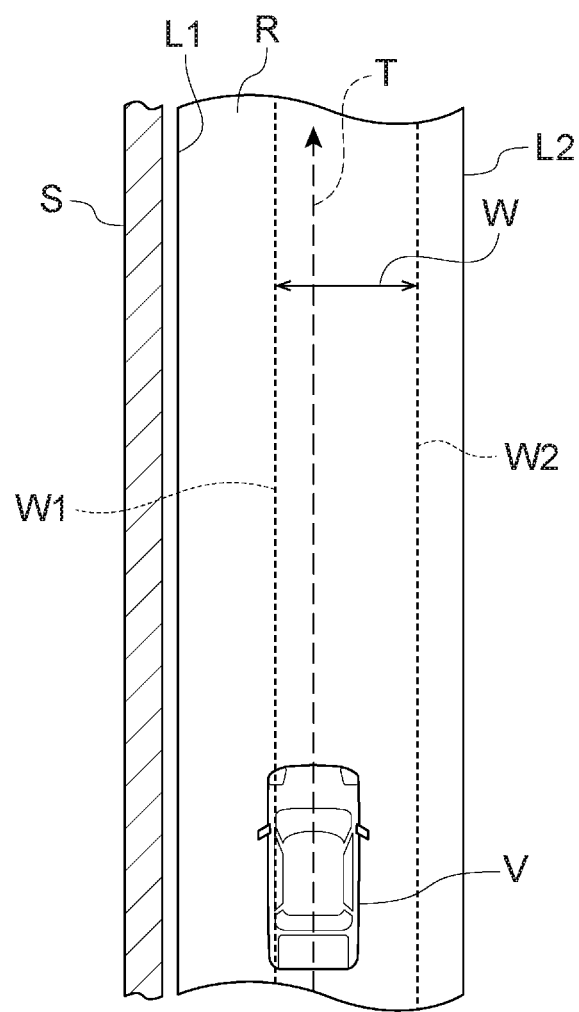
FIG. 3 is a plan view in the case where a control band of a target position is shifted relative to the target position.

FIG. 2 shows a case where the center of the control band W of the target positions is the target track T that connects the target positions. In contrast, the running plan generation unit 14 may generate the control band W such that the control band W is shifted to the right side or the left side of the vehicle V relative to the target track T that connects the target positions. For example, as shown in FIG. 3, in the case where a sidewall S is present so as to be adjacent to the left side of the running lane R, the running plan generation unit 14 may generate the control band W such that the control band W is shifted to the side away from the sidewall S. Thus, the running plan generation unit 14 may generate the control band such that the control band is shifted relative to the target position, for example, depending on the position of an obstacle such as the sidewall S recognized by the surrounding information recognition unit 12. The control band generated so as to be shifted by the running plan generation unit 14 is not limited to the control band of the target position, and the control bands of other target control values may also be generated so as to be shifted relative to the target control values. As the way to shift the control band, for example, the running plan generation unit 14 may shift the control band relative to the target control value such that the control band is away from an obstacle.

Figure 4A:
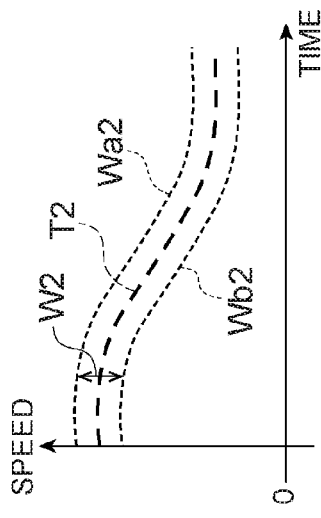
FIG. 4A is a diagram for describing the setting of a yaw angle and a control band of the yaw angle.

FIG. 4A is a diagram for describing the setting of the target yaw angle and the control band of the target yaw angle in the case where the target yaw angle is included as the target control value in the running plan. FIG. 4A shows an example of the temporal change in the target yaw angle of the target control value and the temporal change in the control band of the target yaw angle. Reference character T1 shown by the broken line denotes the temporal change in the clockwise or counterclockwise target yaw angle of the target control value. Reference character Wa1 shown by a dotted line denotes a control band boundary line showing the upper limit of the control band of the clockwise or counterclockwise target yaw angle. Reference character Wb1 shown by a dotted line denotes a control band boundary line showing the lower limit of the control band of the clockwise or counterclockwise target yaw angle. Reference character W1 denotes the control band of the target yaw angle. The control band W1 can be shown as the range from the control band boundary line Wa1, which is the upper limit of the control band, to the control band boundary line Wb1, which is the lower limit of the control band. The running plan generation unit 14 may generate the control band W1 of the target yaw angle such that the control band W1 is shifted relative to the target yaw angle T1.

Figure 4B:
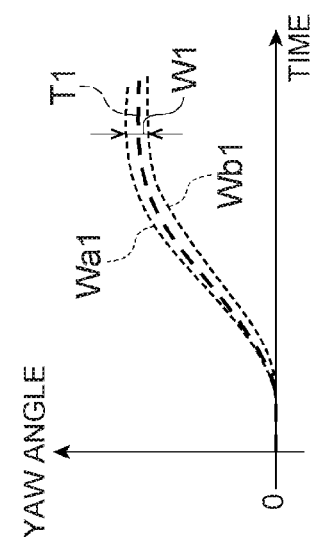
FIG. 4B is a diagram for describing the setting of a speed and a control band of the speed.

FIG. 4B is a diagram for describing the setting of the target speed and the control band of the target speed in the case where the target speed is included as the target control value in the running plan. FIG. 4B shows an example of the temporal change in the target speed of the target control value and the temporal change in the control band of the target speed. Reference character T2 shown by the broken line denotes the temporal change in the target speed of the target control value. Reference character Wa2 shown by a dotted line denotes a control band boundary line showing the upper limit of the control band of the target speed. Reference character Wb2 shown by a dotted line denotes a control band boundary line showing the lower limit of the control band of the target speed. Reference character W2 denotes the control band of the target speed. The control band W2 can be shown by the speed ranging from the control band boundary line Wa2, which is the upper limit of the control band, to the control band boundary line Wb2, which is the lower limit of the control band. The running plan generation unit 14 may generate the control band W2 of the target speed such that the control band W2 is shifted relative to the target speed T2.

Figure 4C:
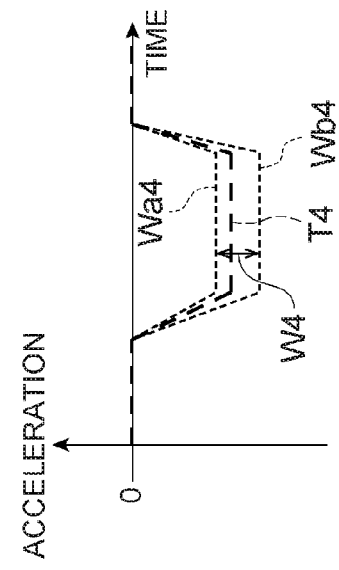
FIG. 4C is a diagram for describing the setting of a curvature and a control band of the curvature.

FIG. 4C is a diagram for describing the setting of the curvature of the target track and the control band of the curvature in the case where the curvature of the target track is included as the target control value in the running plan. FIG. 4C shows an example of the temporal change in the curvature of the target track and the temporal change in the control band of the curvature. Reference character T3 shown by the broken line denotes the temporal change in the curvature of the target track. Reference character Wa3 shown by a dotted line denotes a control band boundary line showing the upper limit of the control band of the curvature. Reference character Wb3 shown by a dotted line denotes a control band boundary line showing the lower limit of the control band of the curvature. Reference character W3 denotes the control band of the curvature. The control band W3 can be shown as the curvature ranging from the control band boundary line Wa3, which is the upper limit of the control band, to the control band boundary line Wb3, which is the lower limit of the control band. The running plan generation unit 14 may generate the control band W3 of the curvature such that the control band W3 is shifted relative to the curvature T3 of the target track.

Figure 4D:
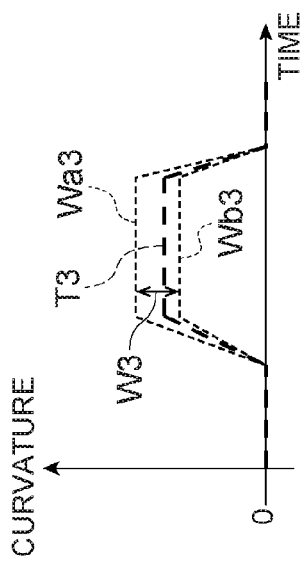
FIG. 4D is a diagram for describing the setting of an acceleration and a control band of the acceleration.

FIG. 4D is a diagram for describing the setting of the target acceleration and the control band of the target acceleration in the case where the target acceleration is included as the target control value in the running plan. FIG. 4D shows an example of the temporal change in the target acceleration of the target control value and the temporal change in the control band of the target acceleration. Reference character T4 shown by the broken line denotes the temporal change in the target acceleration of the target control value. Reference character Wa4 shown by a dotted line denotes a control band boundary line showing the upper limit of the control band of the target acceleration. Reference character Wb4 shown by a dotted line denotes a control band boundary line showing the lower limit of the control band of the target acceleration. Reference character W4 denotes the control band of the target acceleration. The control band W4 can be shown by the acceleration ranging from the control band boundary line Wa4, which is the upper limit of the control band, to the control band boundary line Wb4, which is the lower limit of the control band. The running plan generation unit 14 may generate the control band W4 of the target acceleration such that the control band W4 is shifted relative to the target acceleration T4.

Next, an example of the setting of the control band to be generated by the running plan generation unit 14 will be described. The running plan generation unit 14 may generate the control band, for example, based on the width of the running lane for the vehicle V, which is the surrounding information. On this occasion, as shown in FIG. 5A, in the case where the width of the running lane is wide, the running plan generation unit 14 may increase the control band compared to the case where the width of the running lane is narrow. The running plan generation unit 14 may recognize the width of the running lane, for example, by the acquisition from the surrounding information recognition unit 12.

The running plan generation unit 14 may generate the control band, for example, based on the size of a surrounding vehicle that runs in the surrounding of the vehicle V, which is the surrounding information. The surrounding vehicle, for example, may be a vehicle that runs in front of the vehicle V, and that runs on the running lane for the vehicle V or runs on an adjacent lane adjacent to the running lane for the vehicle V. The size of the surrounding vehicle may be the size in the vehicle width direction, or the size in the front-back direction. On this occasion, as shown in FIG. 5B, in the case where the size of the surrounding vehicle is large, the running plan generation unit 14 may decrease the control band compared to the case where the size of the surrounding vehicle is small. The running plan generation unit 14 may recognize the size of the surrounding vehicle, for example, by the acquisition from the surrounding information recognition unit 12.

The running plan generation unit 14 may generate the control band, for example, based on the speed of the surrounding vehicle that runs in the surrounding of the vehicle V, which is the surrounding information. On this occasion, as shown in FIG. 5C, in the case where the speed of the surrounding vehicle is high, the running plan generation unit 14 may decrease the control band compared to the case where the speed of the surrounding vehicle is low. The running plan generation unit 14 may recognize the speed of the surrounding vehicle, for example, by the acquisition from the surrounding information recognition unit 12.

The running plan generation unit 14 may generate the control band, for example, based on the distance between the surrounding vehicle that runs in the surrounding of the vehicle V and the target track for the vehicle V, which is the surrounding information. On this occasion, as shown in FIG. 5D, in the case where the distance between the surrounding vehicle and the target track for the vehicle V is long, the running plan generation unit 14 may increase the control band compared to the case where the distance between the surrounding vehicle and the target track for the vehicle V is short. The running plan generation unit 14 may recognize the distance between the surrounding vehicle and the target track for the vehicle V, for example, by the acquisition from the surrounding information recognition unit 12.

The running plan generation unit 14 may generate the control band, for example, based on the size of the vehicle V, which is the characteristic information of the vehicle V included in vehicle information. The size of the vehicle V may be the size in the vehicle width direction, or the size in the front-back direction. On this occasion, in the case where the size of the vehicle V is large, the running plan generation unit 14 may decrease the control band compared to the case where the size of the vehicle V is small. The running plan generation unit 14 may recognize the size of the vehicle V, for example, by the acquisition from the vehicle state recognition unit 13.

The running plan generation unit 14 may generate the control band, for example, based on the road type information of the running lane for the vehicle V, which is the surrounding information. On this occasion, in the case where the running lane is on a freeway, the running plan generation unit 14 may increase the control band compared to the case where the running lane is on a general road. The running plan generation unit 14 may recognize the road type information, for example, by the acquisition from the surrounding information recognition unit 12. The running plan generation unit 14 may generate the control band, for example, based on the speed limit of the running lane for the vehicle V, which is part of the surrounding information. On this occasion, in the case where the speed limit is high, the running plan generation unit 14 may decrease the control band compared to the case where the speed limit is low. Here, for example, the speed limit may be included in the map information contained in the map database 4. On this occasion, the surrounding information recognition unit 12 acquires the speed limit, as the surrounding information, from the map database 4. Then, the running plan generation unit 14 may recognize the speed limit as the surrounding information, by the acquisition from the surrounding information recognition unit 12.

The running plan generation unit 14 may generate the control band, for example, based on the running state included in the vehicle state of the vehicle V. On this occasion, in the case where the speed of the vehicle V, which is the running state, is high, the running plan generation unit 14 may decrease the control band compared to the case where the speed of the vehicle V is low. The running plan generation unit 14 may recognize the speed of the vehicle V, for example, by the acquisition from the vehicle state recognition unit 13. In the case where the yaw rate of the vehicle V, which is the running state, is high, the running plan generation unit 14 may decrease the control band compared to the case where the yaw rate of the vehicle V is low. On this occasion, the running plan generation unit 14 may recognize the yaw rate, for example, by the acquisition from the vehicle state recognition unit 13. In the case where the front-back-directional acceleration or lateral acceleration of the vehicle V, which is the running state, is high, the running plan generation unit 14 may decrease the control band compared to the case where the front-back-directional acceleration or lateral acceleration of the vehicle V is low. On this occasion, the running plan generation unit 14 may recognize the front-back-directional acceleration or lateral acceleration, for example, by the acquisition from the vehicle state recognition unit 13.

The running plan generation unit 14 may generate the control band, for example, based on the speed at which the surrounding vehicle comes close to the vehicle V (the relative speed of the obstacle to the vehicle V), which is the surrounding information. On this occasion, in the case where the speed at which the surrounding vehicle comes close to the vehicle V is high, the running plan generation unit 14 may decrease the control band compared to the case where the speed at which the surrounding vehicle comes close to the vehicle V is low. The running plan generation unit 14 may recognize the speed at which the surrounding vehicle comes close to the vehicle V, by the acquisition of data from the surrounding information recognition unit 12.

The running plan generation unit 14 may generate the control band, for example, based on the color and line type of the running lane boundary line present on the right side of the vehicle V, which is the surrounding information. For example, when the vehicle V runs in Japan, in the case where the color of the boundary line on the right side of the running lane is yellow, the running plan generation unit 14 may decrease the control band compared to the case where the boundary line on the right side of the running lane is a broken white line. For example, in the case where the color of the boundary line on the right side of the running lane is yellow, it is necessary to make the vehicle V run such that the vehicle V is not on the boundary line, because of a straying-prohibited boundary line. Therefore, in the case where the color of the boundary line on the right side of the running lane is yellow, the running plan generation unit 14 decreases the control band compared to the case where the boundary line on the right side of the running lane is a broken white line. The running plan generation unit 14 may recognize the color and line type of the running lane boundary line present on the right side of the vehicle V, by the acquisition from the surrounding information recognition unit 12.

The running plan generation unit 14 may generate the control band, for example, based on the reliability of a sensor, which is the characteristic information included in the vehicle information. The reliability of a sensor here may be the reliability of a sensor that is used for the generation of the running plan and that is included in the external sensor 1 or the internal sensor 3. On this occasion, in the case where the reliability of the sensor is low, the running plan generation unit 14 may decrease the control band compared to the case where the reliability of the sensor is high. The running plan generation unit 14 may recognize the reliability of the sensor, for example, by the acquisition from the vehicle state recognition unit 13.

The running plan generation unit 14 may generate the control band, for example, based on the size of the flat area lateral to the running road for the vehicle V, which is the surrounding information. On this occasion, in the case where the flat area is narrow, the running plan generation unit 14 may decrease the control band compared to the case where the flat area is wide. The running plan generation unit 14 may recognize the size of the flat area, for example, by the acquisition from the surrounding information recognition unit 12.

The running plan generation unit 14 may generate the control band, for example, based on the state of the road surface of the running road for the vehicle V, which is the surrounding information. For example, in the case where the road surface is wet due to rain or the like, the running plan generation unit 14 may decrease the control band compared to the case where the road surface is not wet. The running plan generation unit 14 may recognize the state of the road surface, for example, by the acquisition of data from the surrounding information recognition unit 12.

Although the running plan generation unit 14 generates the control band based on any one of various types of surrounding information and a variety of vehicle states in the above description, the running plan generation unit 14 may generate the control band, based on two or more of various types of surrounding information and a variety of vehicle states.

The running control unit 15 controls the automatic running of the vehicle V, based on the running plan and control band generated by the running plan generation unit 14. Specifically, based on the running plan and control band generated by the running plan generation unit 14 and the vehicle state recognized by the vehicle state recognition unit 13, the running control unit 15 computes the command control value such that the vehicle state of the vehicle V becomes a target vehicle state corresponding to the target control value in the running plan. The running control unit 15 outputs the computed command control value to the actuator 6. Thereby, the running control unit 15 controls the running of the vehicle V, such that the vehicle V automatically runs while following the running plan. Here, the target vehicle state corresponding to the target control value is a targeted vehicle state of the vehicle V that is implemented by the output of the actuator 6 depending on the target control value in the running plan.

In more detail, when the current vehicle state is not the target vehicle state corresponding to the target control value in the running plan, the running control unit 15 makes the vehicle state come close to the target vehicle state. On this occasion, the running control unit 15, first, determines whether the current vehicle state recognized by the vehicle state recognition unit 13 is a vehicle state corresponding to the inside of the control band of the target control value. In the case where the current vehicle state is a vehicle state corresponding to the inside of the control band of the target control value, the running control unit 15 computes the command control value such that the vehicle state comes close to the target vehicle state more gradually compared to the case where the current vehicle state is a vehicle state corresponding to the outside of the control band.

Specifically, for example, in the case where the current vehicle position is a position in the inside of the control band of the target position, the running control unit 15 computes the command control value such that the moving amount to the target position in a unit of time (for example, one minute) is smaller compared to the case where the current vehicle position is a position in the outside of the control band. For example, in the case where the current vehicle position is a position in the inside of the control band of the target position, the running control unit 15 computes the command control value so as to make the vehicle state come close to the target vehicle state gradually while placing priority on ride quality, instead of making the vehicle state of the vehicle V come close to the target vehicle state rapidly. Similarly, for example, in the case where the current speed of the vehicle V is a speed in the inside of the control band of the target speed, the running control unit 15 computes the command control value so as to make the vehicle state come close to the target vehicle state gradually while placing priority on ride quality, instead of making the vehicle state of the vehicle V come close to the target vehicle state rapidly. Here, to make the vehicle state come close to the target vehicle state gradually while placing priority on ride quality, for example, may be to make the vehicle state come close to the target vehicle state such that the lateral acceleration to be generated for the vehicle V is maintained at a previously decided reference value or less.

On the other hand, in the case where the current vehicle state recognized by the vehicle state recognition unit 13 is not a vehicle state corresponding to the inside of the control band, the running control unit 15 computes the command control value such that the vehicle state comes close to the target vehicle state more rapidly compared to the case where the current vehicle state is a vehicle state corresponding to the inside of the control band. Specifically, for example, in the case where the current vehicle position is a position in the outside of the control band of the target position, the running control unit 15 computes the command control value such that the moving amount to the target position in a unit of time (for example, one minute) is larger compared to the case where the current vehicle position is a position in the inside of the control band. For example, in the case where the current vehicle position is a position in the outside of the control band of the target position, the running control unit 15 computes the command control value while placing priority not on ride quality but on making the vehicle state of the vehicle V come close to the target vehicle state rapidly. Similarly, for example, in the case where the current speed of the vehicle V is a speed in the outside of the control band of the target speed, the running control unit 15 computes the command control value while placing priority not on ride quality but on making the vehicle state of the vehicle V come close to the target vehicle state rapidly.

That is, in the case where the control band is small, while the vehicle state comes close to the target vehicle state when the vehicle state is a vehicle state corresponding to the outside of the control band, the time to control the vehicle state such that the vehicle state comes close to the target vehicle state rapidly is longer and the time to control the vehicle state such that the vehicle state comes close to the target vehicle state gradually is shorter, compared to the case where the control band is large. Therefore, the automatic driving vehicle system 100 can enhance the following performance of the vehicle state of the vehicle V to the target vehicle state. On the other hand, in the case where the control band is large, while the vehicle state comes close to the target vehicle state when the vehicle state is a vehicle state corresponding to the outside of the control band, the time to control the vehicle state such that the vehicle state comes close to the target vehicle state rapidly is shorter and the time to control the vehicle state such that the vehicle state comes close to the target vehicle state gradually is longer, compared to the case where the control band is small. Therefore, the automatic driving vehicle system 100 can suppress a drastic change in the behavior of the vehicle V and can improve the ride quality.

As an example, a change in the vehicle position in the case where the running control unit 15 controls the running of the vehicle V so as to follow the running plan will be described. Suppose that the vehicle V is running on the running lane R as shown in FIG. 2. Suppose that the vehicle position of the vehicle V is in the outside of the control band W of the target position. Since the vehicle position of the vehicle V is in the outside of the control band W, the running control unit 15 makes the vehicle V run such that the vehicle position rapidly follows the target track T that connects the target positions. The track of the vehicle V at this time is defined as a track K1. When the vehicle position gets to be in the inside of the control band W of the target position, the running control unit 15 makes the vehicle V run such that the vehicle position gradually follows the target track T that connects the target positions. The track of the vehicle V at this time is defined as a track K2. Thus, in the case where the vehicle position of the vehicle V is in the inside of the control band W of the target position, the running control unit 15 makes the vehicle position come close to the target position more gradually than in the case where the vehicle position of the vehicle V is in the outside of the control band W of the target position.

Figure 6:
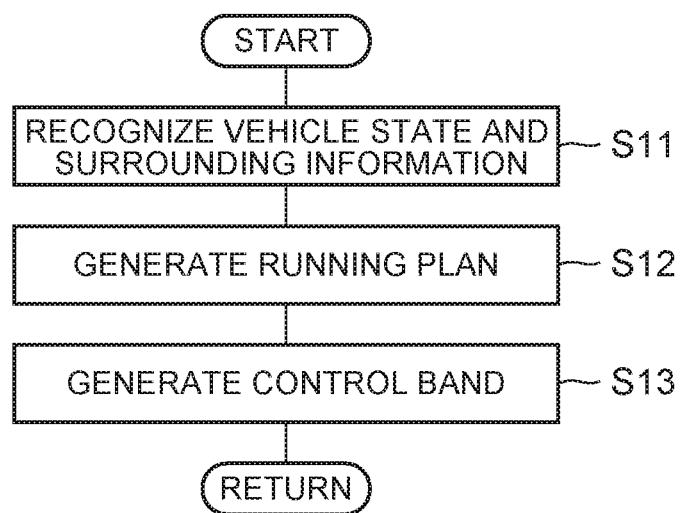
FIG. 6 is a flowchart showing a flow of a process of generating the running plan and the control band.

Next, a flow of processes to be executed by the automatic driving vehicle system 100 will be described. First, a flow of a process by which the ECU 10 generates the running plan and the control band will be specifically described with reference to a flowchart in FIG. 6. For example, when the driver sets a destination with the navigation system 5 and performs, to the HMI 7, the input operation for actuating the automatic driving, the ECU 10 executes the following process of generating the running plan and the control band, repeatedly in a predetermined process cycle.

First, the vehicle state recognition unit 13 recognizes the vehicle state of the vehicle V. The surrounding information recognition unit 12 recognizes the surrounding information of the vehicle V (S11). The running plan generation unit 14 generates a running plan in accordance with a previously set target route, based on the surrounding information of the vehicle V and the map information in the map database 4 (S12). The running plan generation unit 14 generates the control band based on at least one of the surrounding information of the vehicle V recognized by the surrounding information recognition unit 12 and the vehicle state recognized by the vehicle state recognition unit 13 (S13). The running plan generation unit 14 outputs the generated running plan and control band to the running control unit 15.

Figure 7:
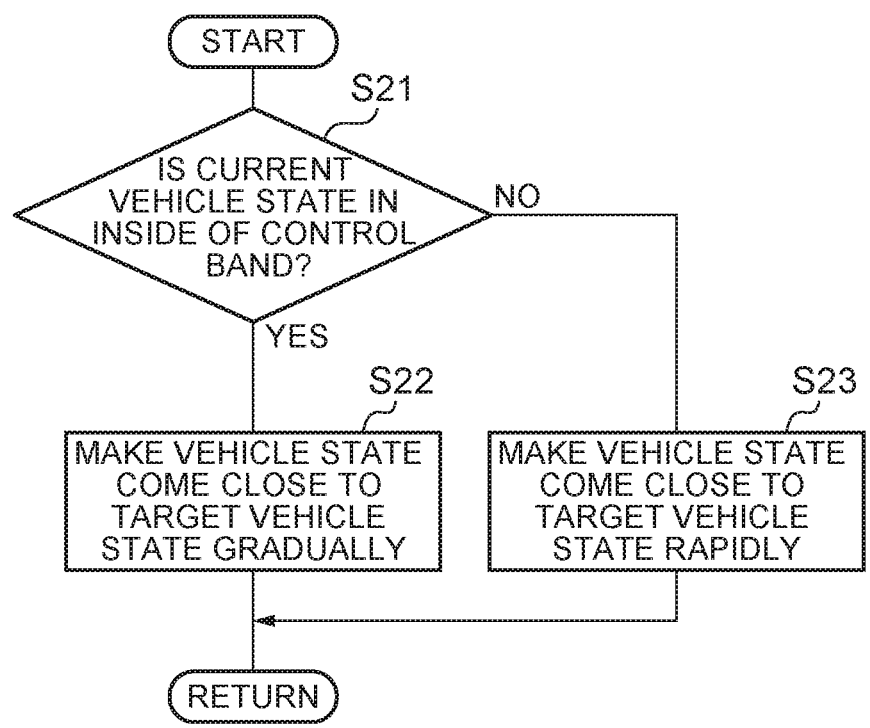
FIG. 7 is a flowchart showing a flow of a process of controlling the running of the vehicle based on the running plan and the control band.

Next, a flow of a process by which the ECU 10 controls the running of the vehicle V based on the running plan and the control band will be specifically described with reference to a flowchart in FIG. 7. Once the running plan generation unit 14 generates the running plan and the control band, the running control unit 15 starts the control of the running of the vehicle V. Further, when the running plan generation unit 14 newly generates the running plan and the control band, the running control unit 15 controls the running of the vehicle V based on the newly generated running plan and the control band.

First, the running control unit 15 determines whether the current vehicle state is a vehicle state corresponding to the inside of the control band of the target control value (S21). In the case where the current vehicle state is a vehicle state corresponding to the inside of the control band of the target control value (S21: YES), the running control unit 15 computes the command control value such that the vehicle state comes close to the target vehicle state more gradually compared to the case where the current vehicle state is a vehicle state corresponding to the outside of the control band. Then, the running control unit 15 outputs the computed command control value to the actuator 6. Thus, the running control unit 15 controls the running of the vehicle V such that the vehicle state comes close to the target vehicle state gradually (S22).

In the case where the current vehicle state is not a vehicle state corresponding to the inside of the control band of the target control value (S21: NO), the running control unit 15 computes the command control value such that the vehicle state comes close to the target vehicle state more rapidly compared to the case where the current vehicle state is a vehicle state corresponding to the inside of the control band. Then, the running control unit 15 outputs the computed command control value to the actuator 6. Thus, the running control unit 15 controls the running of the vehicle V such that the vehicle state comes close to the target vehicle state rapidly (S23).

As described above, in the case where the current vehicle state is a vehicle state corresponding to the inside of the control band, the automatic driving vehicle system 100 in the embodiment makes the vehicle state come close to the target vehicle state more gradually compared to the case where the current vehicle state is a vehicle state corresponding to the outside of the control band. That is, in the case where the current vehicle state is a vehicle state corresponding to the outside of the control band, the automatic driving vehicle system 100 makes the vehicle state come close to the target vehicle state more rapidly compared to the case where the current vehicle state is a vehicle state corresponding to the inside of the control band. Thus, in the case where the vehicle state greatly departs from the running plan (in the case where the current vehicle state is a vehicle state corresponding to the outside of the control band), the automatic driving vehicle system 100 can make the vehicle state come close to the target vehicle state in the running plan rapidly. Further, in the case where the vehicle state slightly departs from the running plan (in the case where the current vehicle state is a vehicle state corresponding to the inside of the control band), the automatic driving vehicle system 100 can improve the ride quality, by making the vehicle state come close to the target vehicle state in the running plan gradually.

Here, in the computation of the command control value, the running control unit 15 may compute a basic command control value for making the vehicle state come close to the target vehicle state. Thereafter, the running control unit 15 may correct the basic command control value such that the vehicle state comes close to the target vehicle state gradually, in the case where the vehicle state is in the inside of the control band of the target control value, or may correct the basic command control value such that the vehicle state comes close to the target vehicle state rapidly, in the case where the vehicle state is in the outside of the control band of the target control value. Here, the basic command control value is a command control value necessary to make the vehicle state come close to the target vehicle state regardless of whether the vehicle state is in the inside of the control band or in the outside of the control band. The basic command control value is corrected as described above, depending on whether the vehicle state is in the inside of the control band of the target control value or in the outside of the control band. Alternatively, instead of previously computing the basic command control value for making the vehicle state come close to the target vehicle state, the running control unit 15 may compute a command control value for making the vehicle state come close to the target vehicle state gradually or rapidly, depending on whether the vehicle state is in the inside of the control band of the target control value.

Second Embodiment

Figure 8:
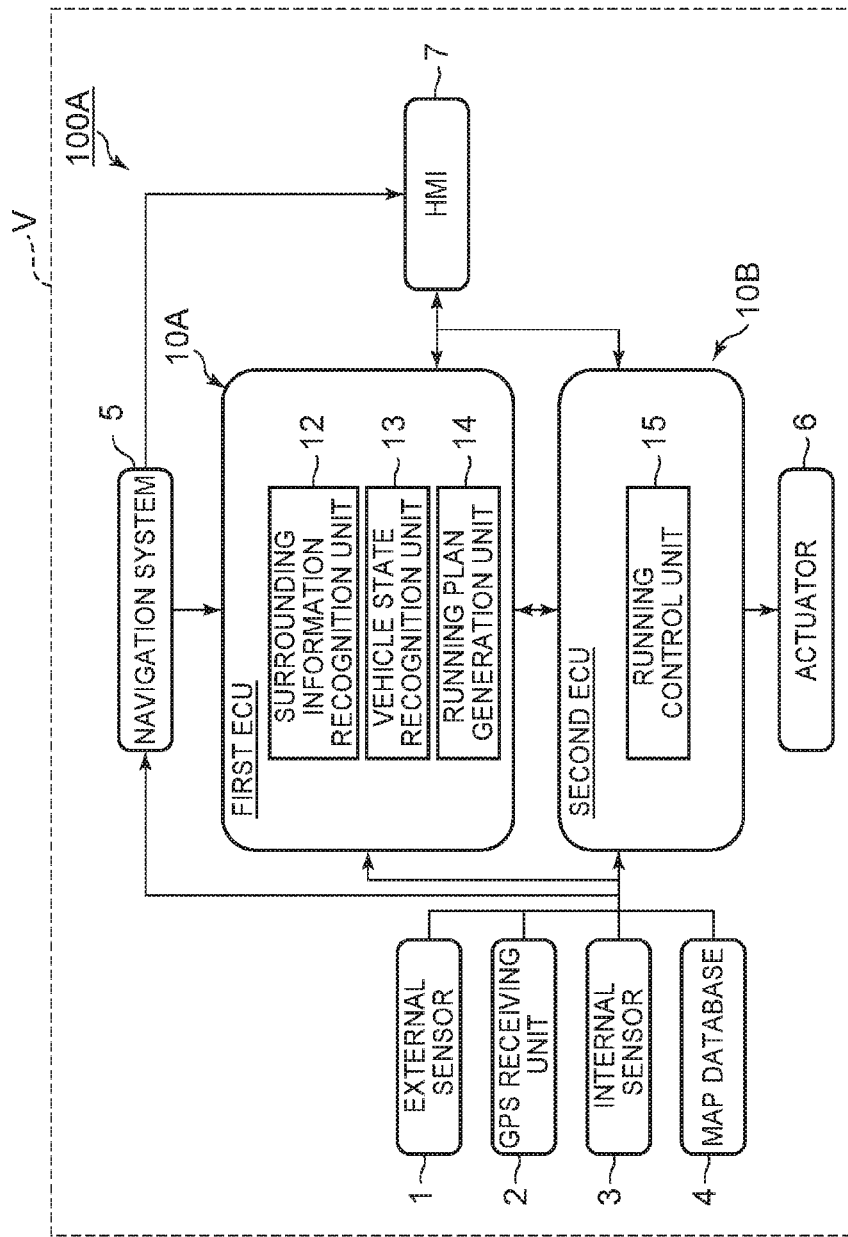
FIG. 8 is a block diagram showing a configuration of an automatic driving vehicle system according to a second embodiment.

Next, a second embodiment will be described. In the description of the embodiment, differences from the first embodiment are described in detail. For elements identical or corresponding to those in the first embodiment, identical reference characters are used, and repetitive descriptions are omitted. FIG. 8 is a block diagram showing a configuration of an automatic driving vehicle system 100A according to the second embodiment. The automatic driving vehicle system 100A includes the external sensor 1, the GPS receiving unit 2, the internal sensor 3, the map database 4, the navigation system 5, the actuator 6, a first ECU 10A, a second ECU 10B, and the HMI 7. Here, the embodiment is different from the first embodiment in that the running plan generation unit 14 and the running control unit 15 are included in different ECUs. Specifically, the running control unit 15 may be included in a second ECU.

The first ECU 10A and the second ECU 10B control the automatic running of the vehicle V. The first ECU 10A is an electronic control unit including a CPU, a ROM, a RAM and the like. In the first ECU 10A, a program stored in the ROM is loaded into the RAM and is executed by the CPU, and thereby, various controls are executed.

The first ECU 10A includes the surrounding information recognition unit 12, the vehicle state recognition unit 13 and the running plan generation unit 14. The processes to be performed by the surrounding information recognition unit 12, the vehicle state recognition unit 13 and the running plan generation unit 14 in the embodiment are the same as the processes to be performed by the surrounding information recognition unit 12, the vehicle state recognition unit 13 and the running plan generation unit 14 in the first embodiment. Further, the surrounding information recognition unit 12 and the vehicle state recognition unit 13 in the embodiment perform the process of S11 described with use of FIG. 6 in the first embodiment. The running plan generation unit 14 in the embodiment performs the processes of S12 and S13 described with use of FIG. 6 in the first embodiment.

The second ECU 10B is an electronic control unit including a CPU, a ROM, a RAM and the like. In the second ECU 10B, a program stored in the ROM is loaded into the RAM and is executed by the CPU, and thereby, various controls are executed.

The second ECU 10B includes the running control unit (first computation unit) 15. The processes to be performed by the running control unit 15 in the embodiment are the same as the processes to be performed by the running control unit 15 in the first embodiment. Further, the running control unit 15 in the embodiment performs the processes of S21 to S23 described with use of FIG. 7 in the first embodiment.

The first ECU 10A and the second ECU 10B are ECUs that are physically different from each other. The first ECU 10A and the second ECU 10B communicate with each other through a communication line.

As described above, in the automatic driving vehicle system 100A in the embodiment, the running plan generation unit 14 and the running control unit 15 are included in different ECUs, and therefore, for example, it is possible to adopt the first ECU 10A as a common element that is employed across vehicle types, and to adopt the second ECU 10B as a vehicle-type-dependent element that differs for each vehicle type. Thereby, it is possible to promote the element commonality, compared to the case where the running plan generation unit 14 and the running control unit 15 are included in a single ECU.

Further, in the automatic driving vehicle system 100A in the embodiment, it is possible to obtain the same effects as in the first embodiment.

Third Embodiment

Figure 9:
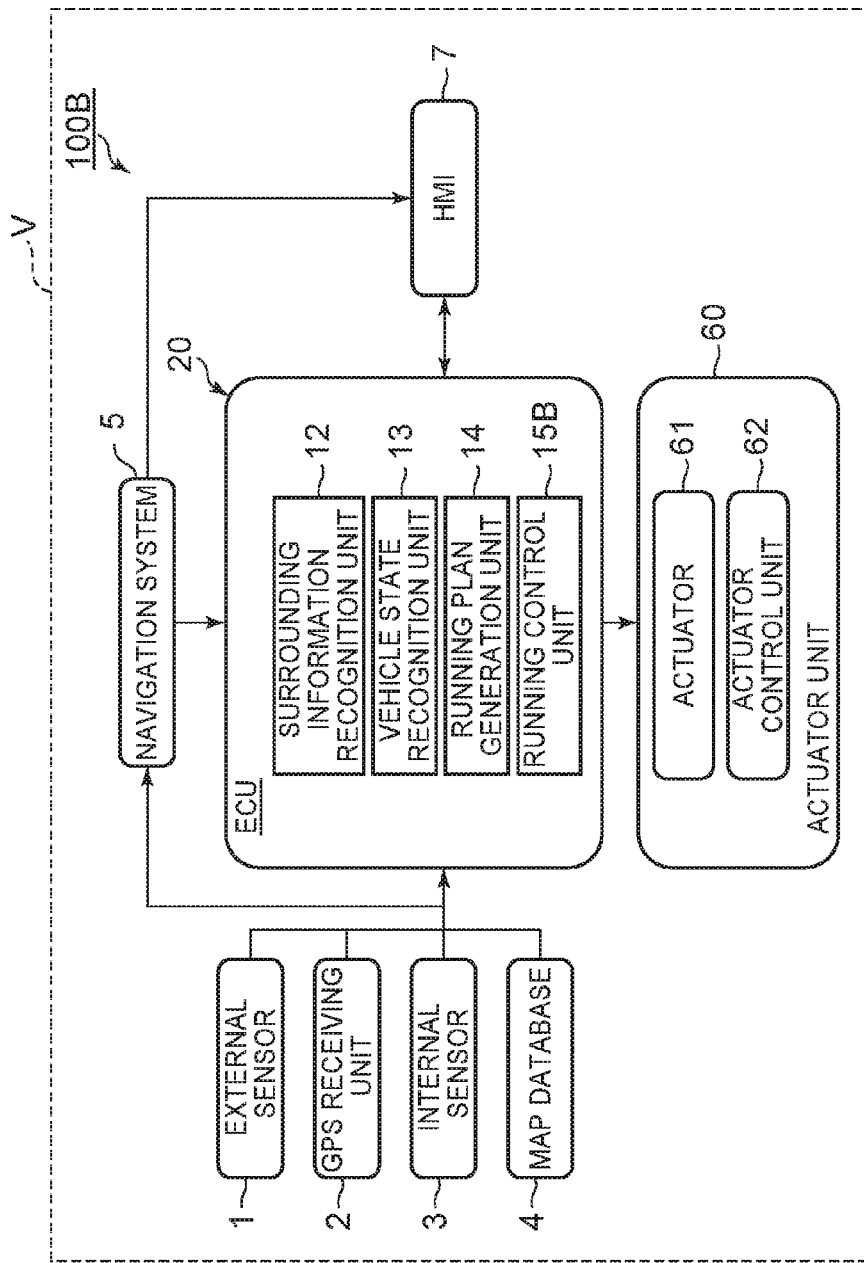
FIG. 9 is a block diagram showing a configuration of an automatic driving vehicle system according to a third embodiment.

Next, a third embodiment will be described. In the description of the embodiment, differences from the first embodiment are described in detail. For elements identical or corresponding to those in the first embodiment, identical reference characters are used, and repetitive descriptions are omitted. FIG. 9 is a block diagram showing a configuration of an automatic driving vehicle system 100B according to the third embodiment. The automatic driving vehicle system 100B includes the external sensor 1, the GPS receiving unit 2, the internal sensor 3, the map database 4, the navigation system 5, an actuator unit 60, an ECU 20, and the HMI 7. Here, the embodiment is different from the first embodiment mainly in that an actuator control unit (actuator controller) 62 of the actuator unit 60 controls an actuator 61 based on the control band.

The ECU 20 controls the automatic running of the vehicle V. The ECU 20 is an electronic control unit including a CPU, a ROM, a RAM and the like. In the ECU 20, a program stored in the ROM is loaded into the RAM and is executed by the CPU, and thereby, various controls are executed. The ECU 20 may be configured by multiple electronic control units.

The ECU 20 includes the surrounding information recognition unit 12, the vehicle state recognition unit 13, the running plan generation unit 14, and a running control unit (second computation unit) 15B. The processes to be performed by the surrounding information recognition unit 12, the vehicle state recognition unit 13 and the running plan generation unit 14 in the embodiment are the same as the processes to be performed by the surrounding information recognition unit 12, the vehicle state recognition unit 13 and the running plan generation unit 14 in the first embodiment. Further, the surrounding information recognition unit 12 and the vehicle state recognition unit 13 in the embodiment perform the process of S11 described with use of FIG. 6 in the first embodiment. The running plan generation unit 14 in the embodiment performs the processes of S12 and S13 described with use of FIG. 6 in the first embodiment.

The running control unit 15B controls the automatic running of the vehicle V, based on the running plan generated by the running plan generation unit 14. Specifically, based on the running plan generated by the running plan generation unit 14 and the vehicle state recognized by the vehicle state recognition unit 13, the running control unit 15B computes the command control value such that the vehicle state of the vehicle V becomes a target vehicle state corresponding to the target control value in the running plan. The running control unit 15B outputs the computed command control value to the actuator unit 60. Thereby, the running control unit 15B controls the running of the vehicle V, such that the vehicle V automatically runs while following the running plan. Further, together with the computed command control value, the running control unit 15B outputs the control band generated by the running plan generation unit 14, to the actuator unit 60. Unlike the running control unit 15 in the first embodiment and the second embodiment, the running control unit 15B does not use the control band in the computation of the command control value.

The actuator unit 60 includes the actuator 61 and the actuator control unit 62. The actuator 61 is the same as the actuator 6 in the first embodiment. The command control value generated by the running plan generation unit 14 is input to the actuator 61. The actuator 61 controls the running of the vehicle V, by the output corresponding to the command control value.

The actuator control unit 62 controls a parameter for the actuator 61, based on the vehicle state recognized by the vehicle state recognition unit 13 and the control band generated by the running plan generation unit 14. The parameter for the actuator 61, for example, is the gain in the feedback of the command control value to the actuator 61. By controlling the parameter for the actuator 61, the actuator control unit 62 changes the responsivity of the action of the actuator 61. Here, to change the responsivity of the action is to change the time needed before the output value of the actuator 61 reaches the command control value input from the running control unit 15B. Specifically, for example, the actuator control unit 62 may alter the gain in the feedback of the command control value to the actuator 61, as the control of the parameter for the actuator 61. Thereby, the actuator control unit 62 can make the vehicle state of the vehicle V come close to the target vehicle state corresponding to the target control value in the running plan rapidly or gradually.

Here, in addition to the alteration of the above gain, the actuator control unit 62 may alter the maximum value of the output that is permitted for control in the actuator 61, as the control of the parameter for the actuator 61.

In more detail, the actuator control unit 62, first, determines whether the current vehicle state recognized by the vehicle state recognition unit 13 is a vehicle state corresponding to the inside of the control band of the target control value. In the case where the current vehicle state is a vehicle state corresponding to the inside of the control band of the target control value, the actuator control unit 62 alters the parameter such that the output of the actuator 61 comes close to an output corresponding to the command control value more gradually compared to the case where the current vehicle state is a vehicle state corresponding to the outside of the control band. On the other hand, in the case where the current vehicle state recognized by the vehicle state recognition unit 13 is not a vehicle state corresponding to the inside of the control band, the actuator control unit 62 alters the parameter (for example, restores the parameter) such that the output of the actuator 61 comes close to an output corresponding to the command control value more rapidly compared to the case where the current vehicle state is a vehicle state corresponding to the inside of the control band.

As an example, a change in the vehicle position in the case where the actuator 61 is controlled such that the output of the actuator 61 becomes an output corresponding to the command control value will be described. Suppose that the vehicle V is running on the running lane R as shown in FIG. 2. Suppose that the vehicle position of the vehicle V is in the outside of the control band W of the target position. Since the vehicle position of the vehicle V is in the outside of the control band W, the actuator control unit 62 controls the parameter for the actuator 61 such that the output of the actuator 61 comes close to the output corresponding to the command control value rapidly. The track of the vehicle V at this time is defined as a track K1. When the vehicle position gets to be in the inside of the control band W of the target position, the actuator control unit 62 controls the parameter for the actuator 61 such that the output of the actuator 61 comes close to the output corresponding to the command control value gradually. The track of the vehicle V at this time is defined as a track K2. Thereby, in the case where the vehicle position is in the inside of the control band W of the target position, the vehicle position of the vehicle V comes close to the target position more gradually than in the case where the vehicle position is in the outside of the control band W of the target position.

Next, a flow of processes to be executed by the automatic driving vehicle system 100B will be described. The flow of the process by which the ECU 20 generates the running plan and the control band is the same as the flow of the process described with use of FIG. 6 in the first embodiment, and therefore, the description is omitted. That is, the surrounding information recognition unit 12 and the vehicle state recognition unit 13 in the embodiment perform the process of S11 described with use of FIG. 6 in the first embodiment. The running plan generation unit 14 in the embodiment performs the processes of S12 and S13 described with use of FIG. 6 in the first embodiment.

Figure 10:
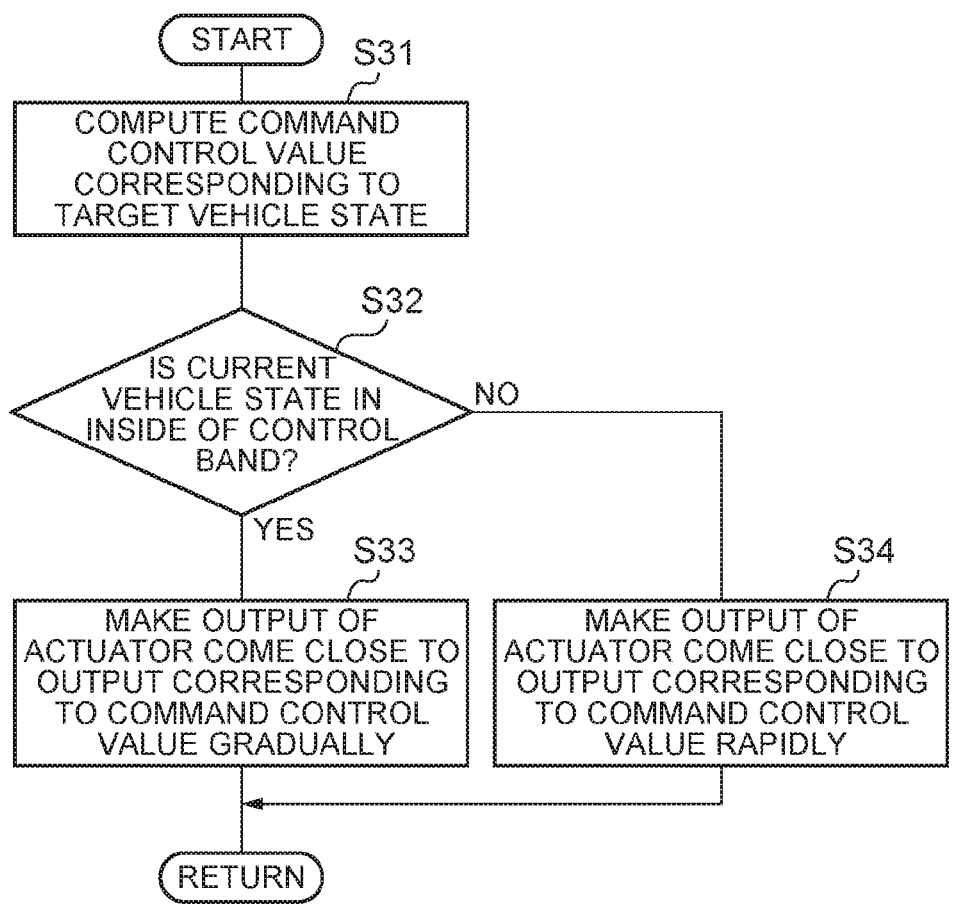
FIG. 10 is a flowchart showing a flow of a process of controlling an actuator based on a command control value and the control band.

Next, a flow of a process by which the running control unit 15B computes the command control value and the actuator control unit 62 controls the parameter for the actuator 61 based on the control band will be specifically described with reference to a flowchart in FIG. 10. Once the running plan generation unit 14 generates the running plan and the control band, the running control unit 15B computes the command control value such that the vehicle state of the vehicle V becomes the target vehicle state corresponding to the target control value in the running plan, based on the running plan generated by the running plan generation unit 14 and the vehicle state recognized by the vehicle state recognition unit 13 (S31). The running control unit 15B outputs the computed command control value and the control band generated by the running plan generation unit 14, to the actuator unit 60.

The actuator control unit 62 determines whether the current vehicle state recognized by the vehicle state recognition unit 13 is a vehicle state corresponding to the inside of the control band of the target control value (S32). In the case where the current vehicle state is a vehicle state corresponding to the inside of the control band of the target control value (S32: YES), the actuator control unit 62 controls the parameter for the actuator 61 such that the output of the actuator 61 comes close to the output corresponding to the command control value more gradually compared to the case where the current vehicle state is a vehicle state corresponding to the outside of the control band (S33). Thereby, the vehicle state of the vehicle V comes close to the target vehicle state gradually.

In the case where the current vehicle state recognized by the vehicle state recognition unit 13 is not a vehicle state corresponding to the inside of the control band of the target control value (S32: NO), the actuator control unit 62 controls the parameter for the actuator 61 such that the output of the actuator 61 comes close to the output corresponding to the command control value more rapidly compared to the case where the current vehicle state is a vehicle state corresponding to the inside of the control band (S34). Thereby, the vehicle state of the vehicle V comes close to the target vehicle state rapidly.

The running control unit 15 and the actuator control unit 62 perform the processes of S31 to S34 based on the current running plan and control band, until the running plan generation unit 14 generates a new running plan and control band.

As described above, in the case where the current vehicle state is a vehicle state corresponding to the inside of the control band, the automatic driving vehicle system 100B in the embodiment makes the output of the actuator 61 come close to the output corresponding to the command control value more gradually compared to the case where the current vehicle state is a vehicle state corresponding to the outside of the control band. That is, in the case where the current vehicle state is a vehicle state corresponding to the outside of the control band, the automatic driving vehicle system 100B makes the output of the actuator 61 come close to the output corresponding to the command control value more rapidly compared to the case where the current vehicle state is a vehicle state corresponding to the inside of the control band. Thereby, in the case where the vehicle state greatly departs from the running plan (in the case where the current vehicle state is a vehicle state corresponding to the outside of the control band), the automatic driving vehicle system 100B can make the vehicle state come close to the target vehicle state in the running plan rapidly. Further, in the case where the vehicle state slightly departs from the running plan (in the case where the current vehicle state is a vehicle state corresponding to the inside of the control band), the automatic driving vehicle system 100B can improve the ride quality, by making the vehicle state come close to the target vehicle state in the running plan gradually.

Here, in the third embodiment, the actuator control unit 62 does not always need to be united with the actuator 61. For example, the actuator control unit 62 may be included in the ECU 20, or may be included in an ECU that is different from the ECU 20.

Further, instead of the control band, the running control unit 15B may output, to the actuator unit 60, a band that is a band of the parameter for the control of the actuator 61 and that is computed based on the control band. On this occasion, the actuator control unit 62 may determine that the current vehicle state is a vehicle state corresponding to the inside of the control band of the target control value, in the case where the current parameter for the control of the actuator 61 is in the inside of the band that is a band of the parameter for the control of the actuator 61 and that is input from the running control unit 15B. Further, the actuator control unit 62 may determine that the current vehicle state is a vehicle state corresponding to the outside of the control band of the target control value, in the case where the current parameter for the control of the actuator 61 is in the outside of the band that is a band of the parameter for control of the actuator 61 and that is input from the running control unit 15B.

Fourth Embodiment

Figure 11:
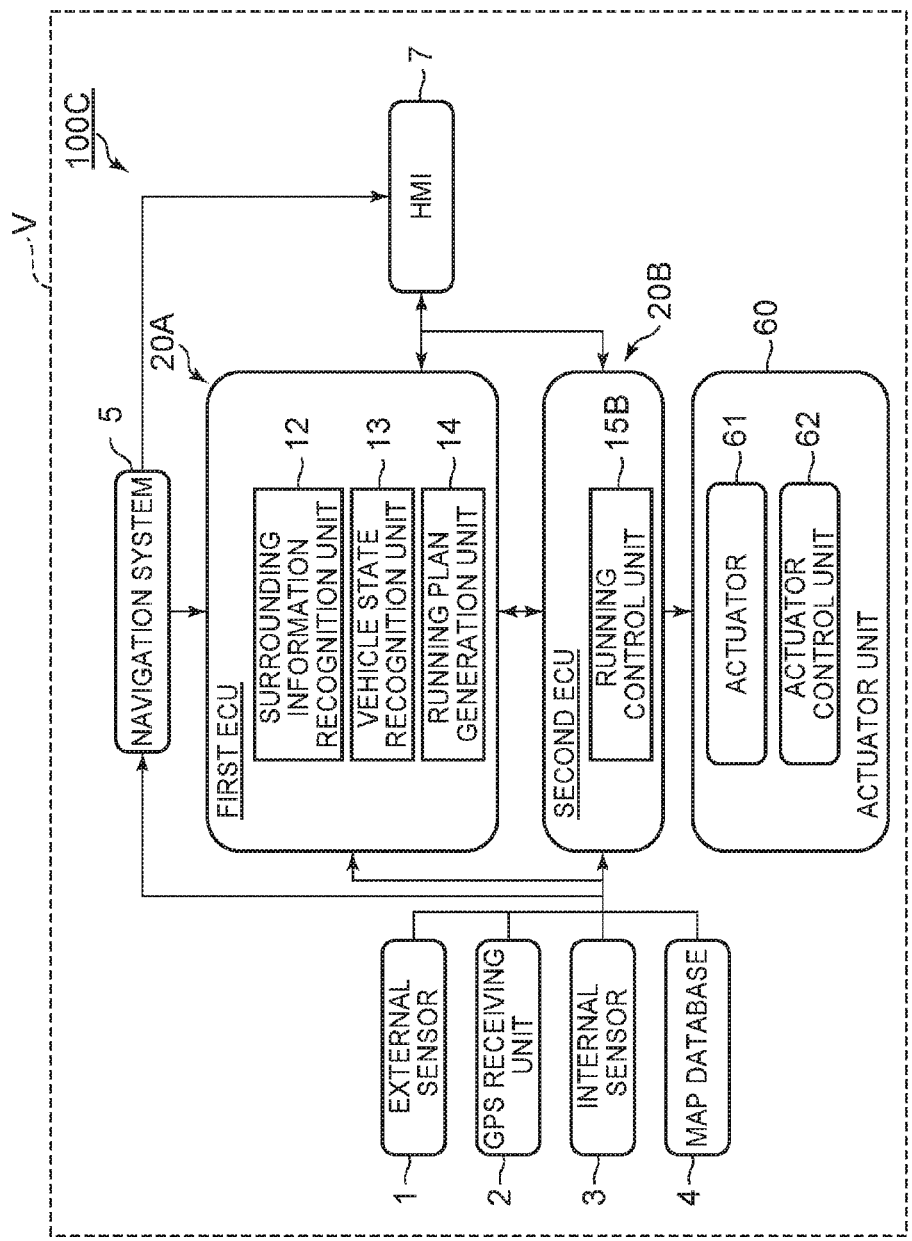
FIG. 11 is a block diagram showing a configuration of an automatic driving vehicle system according to a fourth embodiment.

Next, a fourth embodiment will be described. In the description of the embodiment, differences from the third embodiment are described in detail. For elements identical or corresponding to those in the third embodiment, identical reference characters are used, and repetitive descriptions are omitted. FIG. 11 is a block diagram showing a configuration of an automatic driving vehicle system 100C according to the fourth embodiment. The automatic driving vehicle system 100C includes the external sensor 1, the GPS receiving unit 2, the internal sensor 3, the map database 4, the navigation system 5, the actuator unit 60, a first ECU 20A, a second ECU 20B, and the HMI 7. Here, the embodiment is different from the third embodiment in that the running plan generation unit 14 and the running control unit 15B are included in different ECUs.

The first ECU 20A and the second ECU 20B control the automatic running of the vehicle V. The first ECU 20A is an electronic control unit including a CPU, a ROM, a RAM and the like. In the first ECU 20A, a program stored in the ROM is loaded into the RAM and is executed by the CPU, and thereby, various controls are executed.

The first ECU 20A includes the surrounding information recognition unit 12, the vehicle state recognition unit 13 and the running plan generation unit 14. The process contents to be performed by the surrounding information recognition unit 12, the vehicle state recognition unit 13 and the running plan generation unit 14 in the embodiment are the same as the process contents to be performed by the surrounding information recognition unit 12, the vehicle state recognition unit 13 and the running plan generation unit 14 in the first embodiment. Further, the surrounding information recognition unit 12 and the vehicle state recognition unit 13 in the embodiment perform the process of S11 described with use of FIG. 6 in the first embodiment. The running plan generation unit 14 in the embodiment performs the processes of S12 and S13 described with use of FIG. 6 in the first embodiment.

The second ECU 20B is an electronic control unit including a CPU, a ROM, a RAM and the like. In the second ECU 20B, a program stored in the ROM is loaded into the RAM and is executed by the CPU, and thereby, various controls are executed.

The second ECU 20B includes the running control unit (second computation unit) 15B. The process content to be performed by the running control unit 15B in the embodiment is the same as the process content to be performed by the running control unit 15B in the third embodiment. Further, the running control unit 15B in the embodiment performs the process of S31 described with use of FIG. 10 in the third embodiment.

The first ECU 20A and the second ECU 20B are ECUs that are physically different from each other. The first ECU 20A and the second ECU 20B may communicate with each other through a communication line.

As described above, in the automatic driving vehicle system 100C in the embodiment, the running plan generation unit 14 and the running control unit 15B are included in different ECUs, and therefore, for example, it is possible to adopt the first ECU 20A as a common element that is employed across vehicle types, and to adopt the second ECU 20B as a vehicle-type-dependent element that differs for each vehicle type. Thereby, it is possible to promote the element commonality, compared to the case where the running plan generation unit 14 and the running control unit 15B are included in a single ECU.

Further, in the automatic driving vehicle system 100C in the embodiment, it is possible to obtain the same effects as the third embodiment.

Here, in the fourth embodiment, the actuator control unit 62 does not always need to be united with the actuator 61. For example, the actuator control unit 62 may be included in the second ECU 20B, or may be included in an ECU that is different from the second ECU 20B.

Thus, the exemplary embodiments of the disclosure have been described. However, the invention is not limited to the above embodiments. Hereinafter, various modifications will be described.

[First Modification]

In a first modification, for example, the running plan generation unit 14 in the first embodiment may generate a control band (hereinafter, referred to as a "first control band") of the target control value for the vehicle V in the running plan, and may generate a second control band that includes the first control band and that is wider than the first control band. On this occasion, in the case where the current vehicle state is a vehicle state corresponding to the inside of the second control band of the target control value and corresponding to the outside of the first control band of the target control value, the running control unit 15 computes the command control value such that the vehicle state comes close to the target vehicle state more gradually compared to the case where the current vehicle state is a vehicle state corresponding to the outside of the second control band. Further, in the case where the current vehicle state is a vehicle state corresponding to the inside of the first control band of the target control value, the running control unit 15 computes the command control value such that the vehicle state comes close to the target vehicle state more gradually compared to the case where the current vehicle state is a vehicle state corresponding to the inside of the second control band and corresponding to the outside of the first control band. Thus, the degree of gradualness when the vehicle state comes close to the target vehicle state may be increased in stages, as the vehicle state of the vehicle V comes closer to the target vehicle state.

Here, the running plan generation unit 14 may generate three or more control bands, similarly to the case of generating the first control band and the second control band. On this occasion, the running control unit 15 may increase in stages the degree of gradualness when the vehicle state comes close to the target vehicle state, as the vehicle state of the vehicle V comes closer to the target vehicle state.

As an example, a change in the vehicle position in the case where the running plan generation unit 14 generates the first control band and the second control band will be described. Suppose that the vehicle V is running on the running lane R as shown in FIG. 12. Suppose that the running plan generation unit 14 generates a first control band W11 and a second control band W12 as the control band of the target position. Suppose that the vehicle position of the vehicle V is in the outside of the second control band W12 of the target position. Since the vehicle position of the vehicle V is in the outside of the second control band W12 of the target position, the running control unit 15 makes the vehicle V run such that the vehicle position follows a target track T that connects target positions rapidly. The track of the vehicle V at this time is defined as a track K11. When the vehicle position gets to be in the inside of the second control band W12 of the target position and in the outside of the first control band W11 of the target position, the running control unit 15 makes the vehicle V run such that the vehicle position follows the track T that connects the target positions more gradually compared to the case where the vehicle position is in the outside of the second control band W12. The track of the vehicle V at this time is defined as a track K12. When the vehicle position gets to be in the inside of the first control band W11 of the target position, the running control unit 15 makes the vehicle V run such that the vehicle position follows the target track T that connects the target positions more gradually compared to the case where the vehicle position is in the inside of the second control band W12 and in the outside of the first control band W11. The track of the vehicle V at this time is defined as a track K13. Thus, the vehicle position may come close to the target position more gradually, as the vehicle position comes closer to the target position.

Here, also in the second embodiment, similarly to the first modification, the running plan generation unit 14 may generate multiple control bands, and the running control unit 15 may control the running of the vehicle V based on the generated multiple control bands.

[Second Modification]

Similar to the first modification, in a second modification, for example, the running plan generation unit 14 in the third embodiment may generate the first control band of the target control value for the vehicle V in the running plan, and may generate the second control band that includes the first control band and that is wider than the first control band. On this occasion, in the case where the current vehicle state is a vehicle state corresponding to the inside of the second control band of the target control value and corresponding to the outside of the first control band of the target control value, the actuator control unit 62 alters the parameter such that the output value of the actuator 61 comes close to the command control value more gradually compared to the case where the current vehicle state is a vehicle state corresponding to the outside of the second control band. Further, in the case where the current vehicle state is a vehicle state corresponding to the inside of the first control band of the target control value, the actuator control unit 62 alters the parameter such that the output value of the actuator 61 comes close to the command control value more gradually compared to the case where the current vehicle state is a vehicle state corresponding to the inside of the second control band and corresponding to the outside of the first control band. Thus, the degree of gradualness when the output value of the actuator 61 comes close to the command control value may be increased in stages, as the vehicle state of the vehicle V comes closer to the target vehicle state.

Here, the running plan generation unit 14 may generate three or more control bands, similarly to the case of generating the first control band and the second control band. On this occasion, the actuator control unit 62 may increase in stages the degree of gradualness when the output value of the actuator 61 comes close to the command control value, as the vehicle state of the vehicle V comes closer to the target vehicle state.

As an example, a change in the vehicle position in the case where the running plan generation unit 14 generates the first control band and the second control band will be described. Suppose that the vehicle V is running on the running lane R as shown in FIG. 12. Suppose that the running plan generation unit 14 generates a first control band W11 and a second control band W12 as the control band of the target position. Suppose that the vehicle position of the vehicle V is in the outside of the second control band W12 of the target position. Since the vehicle position of the vehicle V is in the outside of the second control band W12 of the target position, the actuator control unit 62 alters the parameter such that the output value of the actuator 61 comes close to the command control value rapidly. The track of the vehicle V at this time is defined as a track K11. When the vehicle position gets to be in the inside of the second control band W12 of the target position and in the outside of the first control band W11 of the target position, the actuator control unit 62 alters the parameter such that the output value of the actuator 61 comes close to the command control value more gradually compared to the case where the vehicle position is in the outside of the second control band W12. The track of the vehicle V at this time is defined as a track K12. When the vehicle position gets to be in the inside of the first control band W11 of the target position, the actuator control unit 62 alters the parameter such that the output value of the actuator 61 comes close to the command control value more gradually compared to the case where the vehicle position is in the inside of the second control band W12 and in the outside of the first control band W11. The track of the vehicle V at this time is defined as a track K13. Thus, the parameter may be altered such that the output value of the actuator 61 comes close to the command control value more gradually as the vehicle position comes closer to the target position.

Here, also in the fourth embodiment, similarly to the second modification, the running plan generation unit 14 may generate multiple control bands, and the actuator control unit 62 may control the parameter for the actuator 61, based on the generated multiple control bands.

[Third Modification]

In a third modification, for example, the running control unit 15 in the first embodiment may compute a control band lower limit value (the minimum value of the control band), based on at least one of the surrounding information and the vehicle information, and may output the computed control band lower limit value to the running plan generation unit 14. Then, in the generation of the control band, the running plan generation unit 14 may generate the control band such that the control band is the input control band lower limit value or more. The control band lower limit value may be the maximum value of the control error in the case where the vehicle state of the vehicle V is controlled so as to become the target vehicle state. The maximum value of the control error may be computed, for example, based on at least one of the vehicle state of the vehicle V, the characteristic associated with the running of the vehicle V, the reliability of a sensor to be used for the control of the running of the vehicle V, and the state of the road surface.

For example, the vehicle state of the vehicle V may be the speed of the vehicle V, the air pressure of a tire of the vehicle V that is detected by a pneumatic sensor, or the like. In the case where the speed of the vehicle V is high, the running control unit 15 may compute the maximum value of the control error such that the maximum value of the control error is increased compared to the case where the speed of the vehicle V is low. Further, in the case where the air pressure of the tire is low, the running control unit 15 may compute the maximum value of the control error such that the maximum value of the control error is increased compared to the case where the air pressure of the tire is high. For example, the characteristic associated with the running of the vehicle V may be brake performance, acceleration performance or the like. In the case where the brake performance is low, the running control unit 15 may compute the maximum value of the control error such that the maximum value of the control error is increased compared to the case where the brake performance is high. Further, in the case where the acceleration performance is low, the running control unit 15 may compute the maximum value of the control error such that the maximum value of the control error is increased compared to the case where the acceleration performance is high. For example, the reliability of the sensor to be used for the control of the running of the vehicle V may be the reliability of the speed sensor or the like. In the case where the reliability of the speed sensor is low, the running control unit 15 may compute the maximum value of the control error such that the maximum value of the control error is increased compared to the case where the reliability of the speed sensor is high. For example, the state of the road surface is a state in which the road surface is dry, or a state in which the road surface is wet. In the case where the road surface is wet, the running control unit 15 may compute the maximum value of the control error such that the maximum value of the control error is increased compared to the case where the road surface is dry.

Here, for example, at the start time of system activation (for example, at the time when the ignition is turned on), the automatic driving vehicle system 100 may use a previously set standard value, as the characteristic associated with the running of the vehicle V or the reliability of the sensor to be used for the control of the running of the vehicle V. The standard value, for example, may be a value with the assumption of a typical vehicle state, or may be a value with the assumption of a vehicle state in which the controllability of the vehicle is worst. For example, the automatic driving vehicle system 100 may use a dry road surface state or a wet road surface state as the state of the road surface, at the start time of system activation. After the vehicle V starts to run, the automatic driving vehicle system 100 may update the standard value, based on the detection results of various sensors during running.

When generating the control band based on at least one of the surrounding information of the vehicle V recognized by the surrounding information recognition unit 12 and the vehicle state recognized by the vehicle state recognition unit 13, the running plan generation unit 14 generates the control band such that the control band is equal to or more than the control band lower limit value input from the running control unit 15. Since the running plan generation unit 14 generates the control band such that the control band is equal to or more than the control band lower limit value input from the running control unit 15 in this way, the running control unit 15 can control the running of the vehicle V such that the vehicle state of the vehicle V becomes the target vehicle state, within the control band.

Here, there can be a case where the running plan generation unit 14 cannot generate the control band such that the control band is equal to or more than the control band lower limit value input from the running control unit 15 when generating the control band based on at least one of the surrounding information of the vehicle V recognized by the surrounding information recognition unit 12 and the vehicle state recognized by the vehicle state recognition unit 13. Specifically, for example, in the case where the vehicle V performs a high-speed running and where the width of the running lane is narrow, the running plan generation unit 14 generates a small control band. At this time, the running plan generation unit 14 sometimes cannot generate a control band of the control band lower limit value or more. In such a case, for example, the ECU 10 may decelerate the vehicle V to put the vehicle V into a state in which the control band can be generated. Alternatively, the ECU 10 may generate the running plan of the vehicle V again. The ECU 10 may stop the automatic driving control. The ECU 10 may deal with that case, for example, by warning the driver that a control band of the control band lower limit value or more cannot be generated.

To the running plan generation unit 14, the running control unit 15 may output a single control band lower limit value, or may output multiple control band lower limit values. For example, in the case where the control band lower limit value depends on the speed, the running control unit 15 may generate the control band lower limit value for each speed and may output it to the running plan generation unit 14. On this occasion, in the generation of the control band, the running plan generation unit 14, for example, may generate the control band, based on a control band lower limit value corresponding to a speed included in the running plan. In the case where multiple control band lower limit values are provided and where the running plan generation unit 14 can generate only a control band that is smaller than the smallest control band lower limit value, the ECU 10 may decelerate the vehicle V to put the vehicle V into a state in which the control band can be generated, as described above. Similarly, the ECU 10 may generate the running plan of the vehicle V again. Alternatively, the ECU 10 may stop the automatic driving control. The ECU 10 may deal with that case, for example, by warning the driver that a control band of the control band lower limit value or more cannot be generated.

Here, also in the second embodiment, similarly to the third modification, the running control unit 15 may generate the control band lower limit value and may output it to the running plan generation unit 14. Then, the running plan generation unit 14 may generate the control band such that the control band is the input control band lower limit value or more. Also in the third embodiment and the fourth embodiment, similarly to the third modification, the running control unit 15B may generate the control band lower limit value and may output it to the running plan generation unit 14. Then, the running plan generation unit 14 may generate the control band such that the control band is the input control band lower limit value or more.

What is claimed is:

1. An automatic driving vehicle system comprising:
   a surrounding information recognizer configured to recognize surrounding information of a vehicle;
   a vehicle state recognizer configured to recognize a vehicle state of the vehicle;
   a running plan generator configured to generate a running plan, including a target control value that is a target for controlling the vehicle state of the vehicle, based on the surrounding information of the vehicle and configured to generate a control band of the target control value for the vehicle in the running plan, based on at least one of the vehicle state and the surrounding information;
a computer configured to compute a command control value such that the vehicle state becomes a target vehicle state corresponding to the target control value, based on the running plan, the vehicle state and the control band; and
an actuator configured to control running of the vehicle based on the command control value.

2. The automatic driving vehicle system according to claim 1, wherein
in a case where the current vehicle state is a vehicle state corresponding to an inside of the control band, the computer is configured to compute the command control value such that the vehicle state comes close to the target vehicle state more gradually compared to a case where the current vehicle state is a vehicle state corresponding to an outside of the control band.

3. The automatic driving vehicle system according to claim 1, wherein
the running plan generator is included in a first ECU, and the computer is included in a second ECU that is different from the first ECU.

4. The automatic driving vehicle system according to claim 1, wherein the running plan generator is configured to generate two control bands for a target control value for the vehicle in the running plan, based on at least one of the vehicle state and the surrounding information.

5. The automatic driving vehicle system according to claim 1, wherein the running plan generator is configured to generate three or more control bands for a target control value for the vehicle in the running plan, based on at least one of the vehicle state and the surrounding information.

6. The automatic driving vehicle system according to claim 1, wherein the running plan generator is configured to modify the range of the control band in response to changes in surrounding information.

7. The automatic driving vehicle system according to claim 1, wherein the running plan generator is configured to modify the range of the control band in response to changes in the vehicle state.

8. An automatic driving vehicle system comprising:
a surrounding information recognizer configured to recognize surrounding information of a vehicle;
a vehicle state recognizer configured to recognize a vehicle state of the vehicle;
a running plan generator configured to generate a running plan, including a target control value that is a target for controlling the vehicle state of the vehicle, based on the surrounding information of the vehicle and configured to generate a control band of a target control value for the vehicle in the running plan, based on at least one of the vehicle state and the surrounding information;
a computer configured to compute a command control value such that the vehicle state becomes a target vehicle state corresponding to the target control value, based on the running plan;
an actuator configured to control running of the vehicle by an output corresponding to the command control value; and
an actuator controller configured to control a parameter for the actuator based on the vehicle state and the control band.

9. The automatic driving vehicle system according to claim 8, wherein
in a case where the current vehicle state is a vehicle state corresponding to an inside of the control band, the actuator controller is configured to alter the parameter such that the current output of the actuator comes close to the output corresponding to the command control value more gradually compared to a case where the current vehicle state is a vehicle state corresponding to an outside of the control band.

10. The automatic driving vehicle system according to claim 8, wherein
the running plan generator is included in a first ECU, and the computer is included in a second ECU that is different from the first ECU.

11. The automatic driving vehicle system according to claim 8, wherein the running plan generator is configured to generate two control bands for a target control value for the vehicle in the running plan, based on at least one of the vehicle state and the surrounding information.

12. The automatic driving vehicle system according to claim 8, wherein the running plan generator is configured to generate three or more control bands for a target control value for the vehicle in the running plan, based on at least one of the vehicle state and the surrounding information.

13. The automatic driving vehicle system according to claim 8, wherein the running plan generator is configured to modify the range of the control band in response to changes in surrounding information.

14. The automatic driving vehicle system according to claim 8, wherein the running plan generator is configured to modify the range of the control band in response to changes in the vehicle state.

15. An automatic driving vehicle system comprising:
an electronic control unit including a processor configured to:
recognize surrounding information of a vehicle;
recognize a vehicle state of the vehicle;
generate a running plan based on the surrounding information of the vehicle;
generate a control band of a target control value for the vehicle in the running plan, based on at least one of the vehicle state or the surrounding information;
compute a command control value such that the vehicle state becomes a target vehicle state corresponding to the target control value, based on the running plan, the vehicle state and the control band; and
an actuator configured to control the running of the vehicle based on the command control value received from the electronic control unit.

* * * * *